US012032190B2

(12) United States Patent
Kotov et al.

(10) Patent No.: US 12,032,190 B2
(45) Date of Patent: *Jul. 9, 2024

(54) MATERIAL-SENSING LIGHT IMAGING, DETECTION, AND RANGING (LIDAR) SYSTEMS

(71) Applicant: THE REGENTS OF THE UNIVERSITY OF MICHIGAN, Ann Arbor, MI (US)

(72) Inventors: Nicholas A. Kotov, Ypsilanti, MI (US); Sharon Glotzer, Chelsea, MI (US); Brian Shahbazian, Petaluma, CA (US); Ryan Branch, Indianapolis, IN (US); Lizhi Xu, Ann Arbor, MI (US); Wonjin Choi, Ann Arbor, MI (US); Minjeong Cha, Ann Arbor, MI (US); Matthew Spellings, Mercer, TN (US)

(73) Assignee: The Regents of The University of Michigan, Ann Arbor, MI (US)

( * ) Notice: Subject to any disclaimer, the term of this patent is extended or adjusted under 35 U.S.C. 154(b) by 555 days.

This patent is subject to a terminal disclaimer.

(21) Appl. No.: 17/231,736

(22) Filed: Apr. 15, 2021

(65) Prior Publication Data

US 2021/0231852 A1  Jul. 29, 2021

Related U.S. Application Data

(63) Continuation of application No. 16/755,804, filed as application No. PCT/US2018/055708 on Oct. 12, 2018, now Pat. No. 10,983,219.

(Continued)

(51) Int. Cl.
*G01C 3/08* (2006.01)
*G01S 7/481* (2006.01)
(Continued)

(52) U.S. Cl.
CPC ............ *G02B 5/3025* (2013.01); *G01S 7/481* (2013.01); *G01S 17/89* (2013.01); *G01S 17/931* (2020.01)

(58) Field of Classification Search
None
See application file for complete search history.

(56) References Cited

U.S. PATENT DOCUMENTS 5,483,346 A   1/1996  Butzer
5,835,222 A   11/1998 Herzinger
(Continued)

FOREIGN PATENT DOCUMENTS

CN  101715540 A      5/2010
CN  102753818 A  *  10/2012  ............. B64D 15/20
(Continued)

OTHER PUBLICATIONS

First Office Action for corresponding Japanese Application No. 2020-520591 dated Jan. 7, 2022, with translation; 11 pages.
(Continued)

*Primary Examiner* — Mark Hellner
(74) *Attorney, Agent, or Firm* — Harness, Dickey & Pierce, P.L.C.

(57) ABSTRACT

Material-Sensing Light Imaging, Detection, And Ranging (LIDAR) systems optionally include a laser configured to generate a light pulse, a beam steerer configured to produce a polarization-adjusted light pulse emitted towards an object, at least one polarizer configured to polarize reflected, scattered, or emitted light returned from the object, and a processor configured to detect at least one material of the object based on an intensity and polarization of the polarized reflected, scattered or emitted light from the object. The beam steerer may include a kirigami nanocomposite. Methods are also provided, including, for example, generating a
(Continued)

light pulse, adjusting a polarization of the light pulse to produce a polarization-adjusted light pulse emitted towards an object, polarizing reflected, scattered, or emitted light returned from the object, and detecting at least one material of the object based on an intensity and polarization of the polarized reflected, scattered or emitted light from the object.

22 Claims, 11 Drawing Sheets

Related U.S. Application Data

(60) Provisional application No. 62/571,986, filed on Oct. 13, 2017.

(51) Int. Cl.
*G01S 17/89* (2020.01)
*G02B 5/30* (2006.01)
*G01S 17/931* (2020.01)

(56) References Cited

U.S. PATENT DOCUMENTS

| | | | |
|---|---|---|---|
| 5,841,538 A | 11/1998 | Schoeffler et al. | |
| 5,850,284 A | 12/1998 | Schoeffler et al. | |
| 5,929,443 A | 7/1999 | Alfano et al. | |
| 6,069,464 A | 5/2000 | Wu | |
| 6,888,638 B1 | 5/2005 | Hill | |
| 7,580,127 B1 | 8/2009 | Mayor et al. | |
| 8,054,464 B2 | 11/2011 | Mathur et al. | |
| 8,724,099 B2 | 5/2014 | Asahara et al. | |
| 10,371,625 B1 | 8/2019 | Twede et al. | |
| 10,983,219 B2* | 4/2021 | Kotov | G02B 5/3025 |
| 11,156,749 B2 | 10/2021 | Kotov et al. | |
| 2005/0264813 A1* | 12/2005 | Giakos | G01J 4/04 |
| | | | 356/369 |
| 2007/0024849 A1 | 2/2007 | Carrig et al. | |
| 2010/0280765 A1 | 11/2010 | Marquardt et al. | |
| 2011/0181881 A1 | 7/2011 | Mathur et al. | |
| 2012/0026497 A1 | 2/2012 | Mathur et al. | |
| 2016/0299270 A1 | 10/2016 | Kotov et al. | |
| 2017/0011499 A1 | 1/2017 | Reinhardt | |
| 2020/0025618 A1 | 1/2020 | Kotov et al. | |

FOREIGN PATENT DOCUMENTS

| | | |
|---|---|---|
| CN | 104034703 A | 9/2014 |
| CN | 105814451 A | 7/2016 |
| CN | 205809294 U | 12/2016 |
| CN | 106796456 A | 5/2017 |
| DE | 102016011340 A1 | 3/2017 |
| EP | 0737856 A2 | 10/1996 |
| JP | H01213552 A | 8/1989 |
| JP | H0618408 A | 1/1994 |
| JP | 108136455 A | 5/1996 |
| JP | 2012145531 A | 8/2012 |
| JP | 2013529775 A | 7/2013 |
| JP | 2014228300 A | 12/2014 |
| JP | 2016176724 A | 10/2016 |
| WO | WO-2014189059 A1 | 11/2014 |

OTHER PUBLICATIONS

Tetsuo Kan et al., "Enantiomeric Switching of Chiral Metamaterial for Terahertz Polarization Modulation Employing Vertically Deformable MEMS Spirals", Nature Communications; vol. 6, Article No. 8422 (2015); Oct. 1, 2015; pp. 1-7.

Nobuo Sugimoto, Monitoring of Asian Dust and Air-Pollution Aerosols Using a Network of Polarized Lidars, Laser Research; 2011 vol. 39, No. 8; Aug. 2011; p. 579-584; https://doi.org/10.2184/lsj.39.579.

Decision of Rejection for corresponding Japanese Application No. 2020-520591 dated Aug. 26, 2022 with translation; 6 pages.

Second Office Action for corresponding Japanese Application No. 2020-520591 dated May 11, 2022 with translation; 5 pages.

European Office Action regarding Application No. 18899861.1, dated Mar. 13, 2023.

Re-examination Report regarding corresponding Japanese Patent Application No. 2020-520591 dated Mar. 24, 2023, with translation; 5 pages.

Korean Office Action regarding Patent Application No. 10-2020-7013470, dated Aug. 24, 2022.

Second Office Action regarding Chinese Patent Application No. 201880074571.6, dated Jun. 21, 2023. Translation provided by Unitalen Attorneys at Law.

First Office Action regarding Chinese Patent Application No. 201880074571.6, dated Jan. 10, 2023. Translation provided by Unitalen Attorneys at Law.

"Enantiomeric switching of chiral metamaterial for terahertz polarization modulation employing vertically deformable MEMS spirals," Tetsuo Kan et al., Nature Communications, pp. 1-7, Oct. 2015.

U.S. Appl. No. 16/755,804, filed Apr. 13, 2020.

Extended European Search Report, corresponding to EP1889861, EPO/SA/Munich, dated Apr. 29, 2021.

Japanese Office Action regarding Application No. 2022-211690, dated Oct. 18, 2023. Translation provided by Asamura IP, P.C.

International Search Report and Written Opinion for International Application No. PCT/US2018/055708 dated Jun. 25, 2019 (ISAIS), 6 pages.

Podsiadlo, Paul et al., "Ultrastrong and Stiff Layered Polymer Nanocomposites," Science 318, 80 (2007) pp. 80-83; DOI: 10.1126/science.1143176.

Shyu, Terry C. et al., "A kirigami approach to engineering elasticity in nanocomposites through patterned defects," Nature Materials 14, pp. 785-790; DOI: 10.1038/NMAT4327.

Shalev-Shwartz, Shai et al., "On a Formal Model of Safe and Scalable Self-Driving Cars," [retrieved from Internet] <URL: arxiv.org/abs/1708.06374> (Published Aug. 21, 2017), 37 pages.

Xu, L. et al., "Kirigami Nanocomposites as Wide-Angle Diffraction Gratings," ACS Nano 10 (2016), pp. 6156-6162.

* cited by examiner

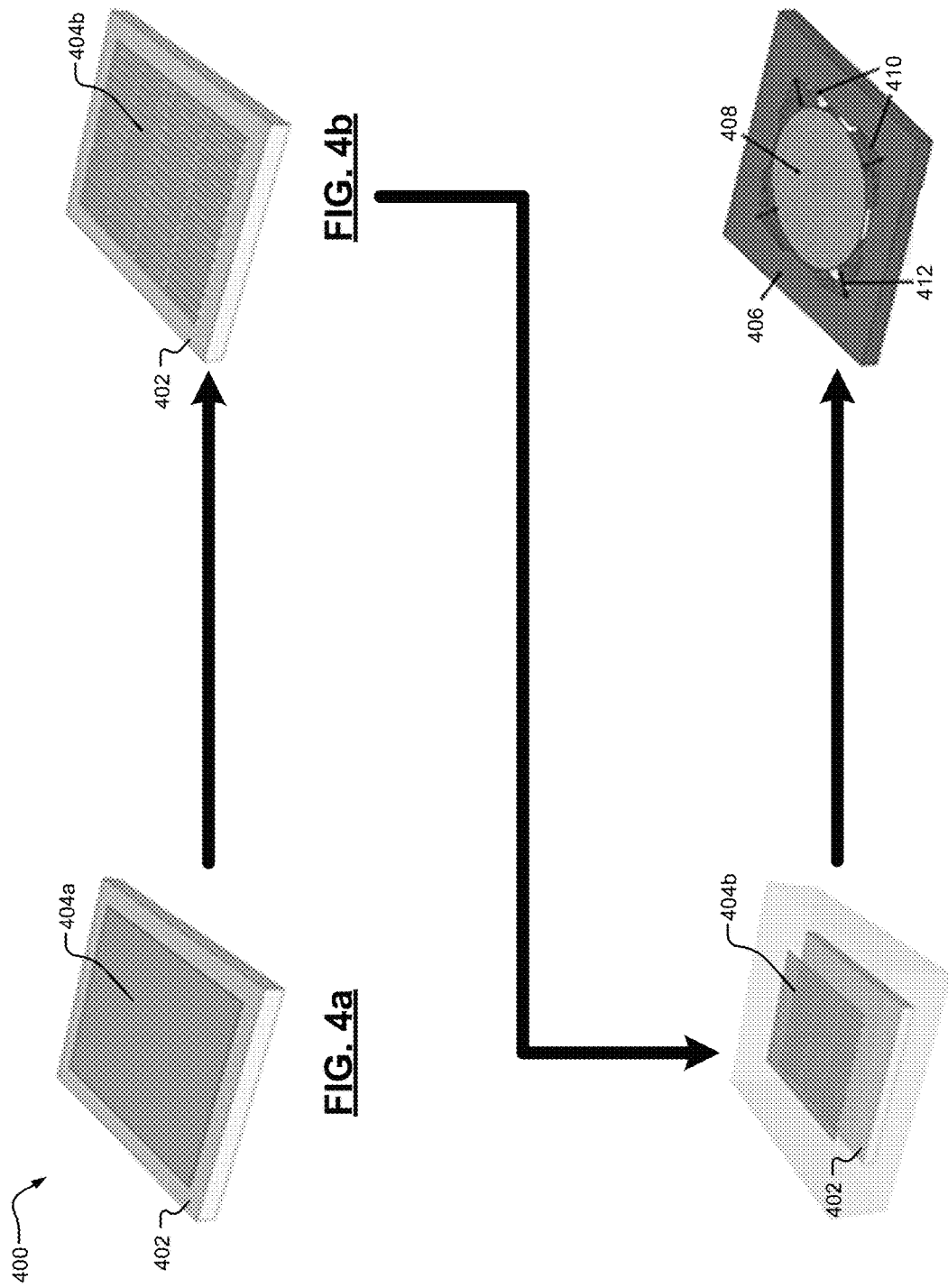

MATERIAL-SENSING LIGHT IMAGING, DETECTION, AND RANGING (LIDAR) SYSTEMS

CROSS-REFERENCE TO RELATED APPLICATIONS

This application is a continuation of U.S. patent application Ser. No. 16/755,804 filed on Apr. 13, 2020 which will issue as U.S. Pat. No. 10,983,219 on Apr. 20, 2021, which is a U.S. National Phase Application under 35 U.S.C. 371 of International Application No. PCT/US2018/055708 filed on Oct. 12, 2018, which claims the benefit of U.S. Provisional Application No. 62/571,986 filed on Oct. 13, 2017. The entire disclosure disclosures of the above application is applications are incorporated herein by reference.

GOVERNMENT SUPPORT

This invention was made with government support under 1240264 awarded by the National Science Foundation. The Government has certain rights in the present disclosure.

FIELD

The present disclosure relates to Light Imaging, Detection, And Ranging (LIDAR) systems and, more particularly, to materials-sensing LIDAR systems and methods for making and using the same.

BACKGROUND

This section provides background information related to the present disclosure which is not necessarily prior art.

LIDAR is a surveying method that measures distance to an object by illuminating the object with a pulsed laser light, and measuring the reflected pulses with a sensor. Differences in laser return times and wavelengths can then be used to make digital 3D-representations of the detected object. LIDAR may be used to produce high-resolution maps, with applications in geodesy, geomatics, archaeology, geography, geology, geomorphology, seismology, forestry, atmospheric physics, laser guidance, airborne laser swath mapping (ALSM), and laser altimetry. LIDAR technology may also be used for the control and navigation of autonomous cars.

A conventional LIDAR device may operate as follows. A laser source produces a pulse of polarized or unpolarized light at a specific wavelength. When the light is first emitted, a time-of-flight sensor records the initial time. The time-of-flight is used to determine the total distance the light travels from source to detector by using the speed at which light travels.

The emitted light is then "steered" in a given angle. This "steering" can also include the splitting of a light pulse into multiple pulse components aimed at various angles. The steering angle(s) will change over time in order to obtain a specific field of view for a comprehensive mapping of the environment. After it has been aimed, the light may pass through linear polarization optics before and after the emission. These types of LIDARs are known as polarization LIDARs, and may use polarization optics at a registration step.

Conventional LIDAR devices typically employ optical lenses that are bulky and expensive. Moreover, the optical lenses utilized in conventional LIDAR devices require extensive protective packaging due to their sensitivity to moisture, which increases the weight, size, and complexity of the LIDAR devices in which they are employed. One well-known problem with implementation of LIDAR systems with rotational optics (e.g., the Velodyne-HDL64™ model) in autonomous vehicles and robots is their large size and high cost. The rotation of the entire device to steer laser beams reduces reliability, restricts miniaturization, and increases energy consumption. LIDAR systems based on solid-state beam steering address this problem, but their implementation is impeded by insufficient accuracy and range. Another issue is the performance of LIDARs and all the other sensors in inclement weather. Currently utilized laser beams with wavelengths around 900-940 nm can be strongly scattered by rain, fog, and snow, so that their read-outs can become highly uncertain under such conditions.

In addition, conventional LIDAR devices and their appurtenant analysis systems have proven limited in their ability to accurately to perform object recognition. For example, LIDAR point clouds are known to be based solely on a distance read-out from the laser source to the object. In this representation of the human world, a person resting on a bench and a statue of the same are identical. The problem is also true for a sleeping baby and a similarly sized plastic doll lying next to it, or when attempting to distinguish a black car in the distance from the pavement. The burden of distinguishing these objects and deciphering the surroundings is carried by the computational processing of these 3D maps.

Adequate classification of objects based on their geometries is not a trivial problem, requiring complex algorithms and large computational power, especially considering the highly dynamic nature of various environments. Furthermore, typical LIDAR hardware makes adequate object recognition and classification even more difficult because the current beam steering methods cause clustering and banding of points in LIDAR clouds, which results in ambiguous interpretation of 3D images and their individual points. Consequently, the geometry-based perception of surroundings demands high computational costs, large energy consumption, and long processing times.

Accordingly, improved LIDAR systems and methods are desired, especially LIDAR systems and methods providing an ability to identify the material from which an object is formed.

SUMMARY

This section provides a general summary of the disclosure, and is not a comprehensive disclosure of its full scope or all of its features.

In certain aspects, the present disclosure provides a system comprising a laser configured to generate a light pulse, a beam steerer configured to produce a polarization-adjusted light pulse emitted towards an object, at least one polarizer configured to polarize reflected, scattered, or emitted light returned from the object, and a processor configured to detect at least one material of the object based on an intensity and polarization of the polarized reflected, scattered or emitted light from the object.

In one aspect, the beam steerer comprises a kirigami nanocomposite.

In one aspect, the at least one polarizer comprises a kirigami nanocomposite.

In one aspect, the processor is further configured to classify the object based on the detected at least one material of the object.

In a further aspect, the processor is configured to classify the object based on the detected at least one material of the object by applying a machine-learning algorithm.

In a further aspect, the machine-learning algorithm comprises an artificial neural network algorithm.

In one aspect, the beam steerer is configured to adjust a polarization of the light pulse to produce the polarization-adjusted light pulse.

In one aspect, the beam steerer is configured to adjust a polarization of the light pulse by at least one of imparting a polarization to an unpolarized light pulse and changing a polarization of a polarized light pulse.

In one aspect, the beam steerer is configured to adjust a polarization of the light pulse by applying at least one of the following types of polarization: linear polarization, circular polarization, and elliptical polarization.

In a further aspect, applying linear polarization comprises applying at least one of s-type linear polarization and p-type linear polarization.

In one aspect, the at least one polarizer is configured to polarize the reflected, scattered, or emitted light returned from the object by applying at least one of the following types of polarization: linear polarization, circular polarization, and elliptical polarization.

In a further aspect, the applying is applying linear polarization that comprises applying at least one of s-type linear polarization and p-type linear polarization.

In one aspect, the at least one polarizer comprises a plurality of polarizers.

In one aspect, the system further comprises at least one polarization detector connected to the at least one polarizer and the processor, wherein the at least one polarization detector is configured to detect the intensity of the polarized reflected, scattered or emitted light from the object.

In a further aspect, the at least one polarization detector comprises a plurality of polarization detectors.

In a further aspect, the at least one polarization detector is configured to detect an angle of incidence associated with the polarized reflected, scattered or emitted light from the object.

In a further aspect, the processor is further configured to detect the at least one material of the object based on the angle of incidence associated with the polarized reflected, scattered or emitted light from the object.

In yet other variations, the present disclosure provides a method comprising generating a light pulse, adjusting a polarization of the light pulse to produce a polarization-adjusted light pulse emitted towards an object, polarizing reflected, scattered, or emitted light returned from the object, and detecting at least one material of the object based on an intensity and polarization of the polarized reflected, scattered or emitted light from the object.

In one aspect, adjusting the polarization of the light pulse is performed by a beam steerer comprising a kirigami nanocomposite.

In one aspect, the kirigami nanocomposite is manufactured via a vacuum-assisted filtration (VAF) process.

In one aspect, the kirigami nanocomposite is manufactured via a layer-by-layer (LBL) deposition process.

In one aspect, the method further comprises classifying the object based on the detected at least one material of the object.

In one aspect, classifying the object comprises classifying the object by applying a machine-learning algorithm.

In one aspect, the machine-learning algorithm comprises an artificial neural network algorithm.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 4a-4d illustrate a representative simplified process for manufacturing nano-kirigami-based optical elements according to certain aspects of the present disclosure;

Figure 5C:
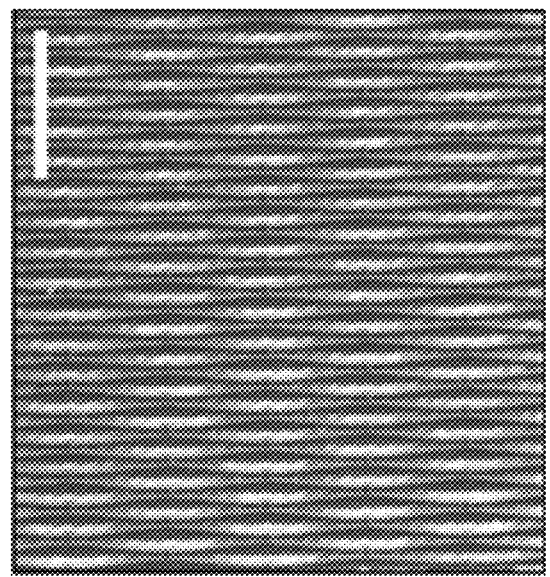
Figure 5B:
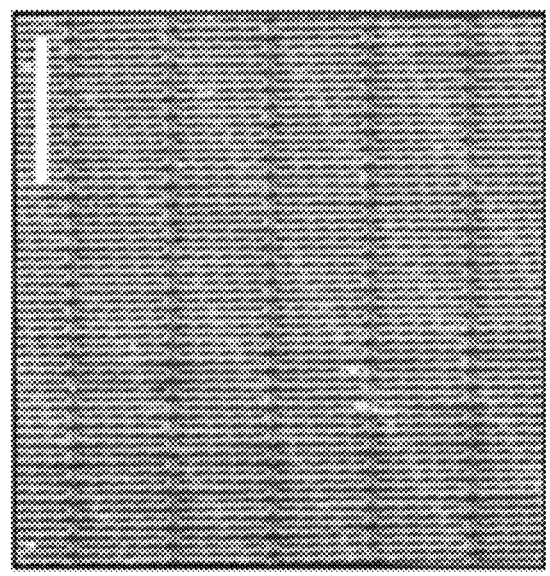
Figure 5A:
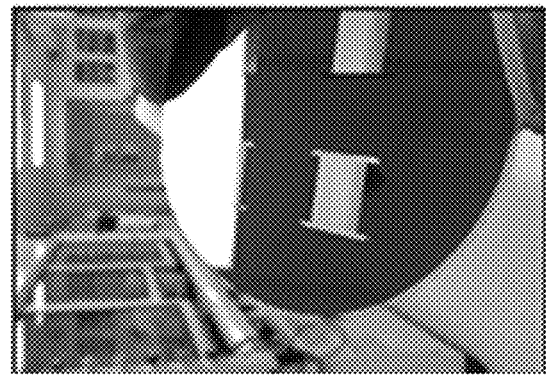
Figure 6:
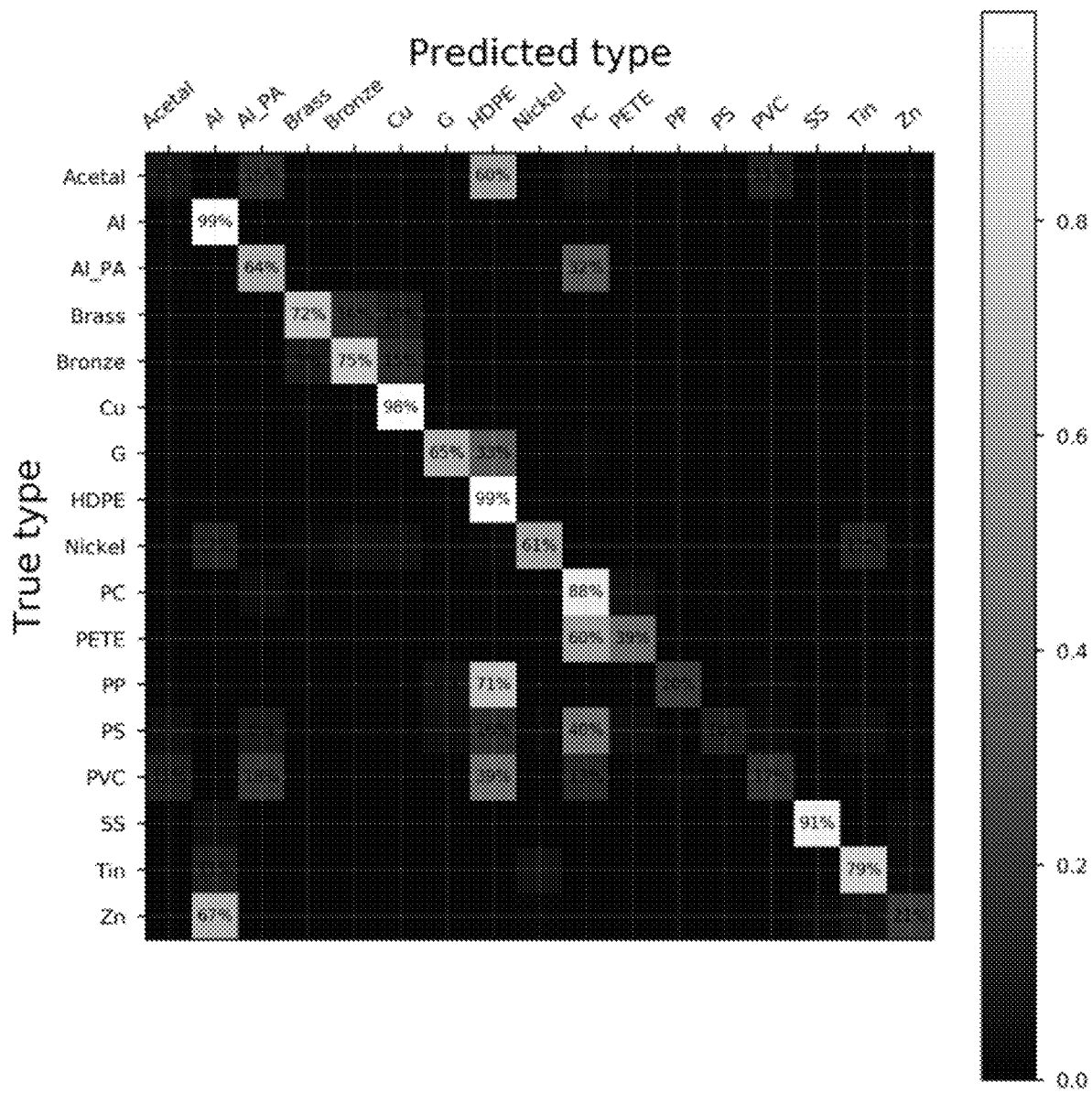
Figure 7:
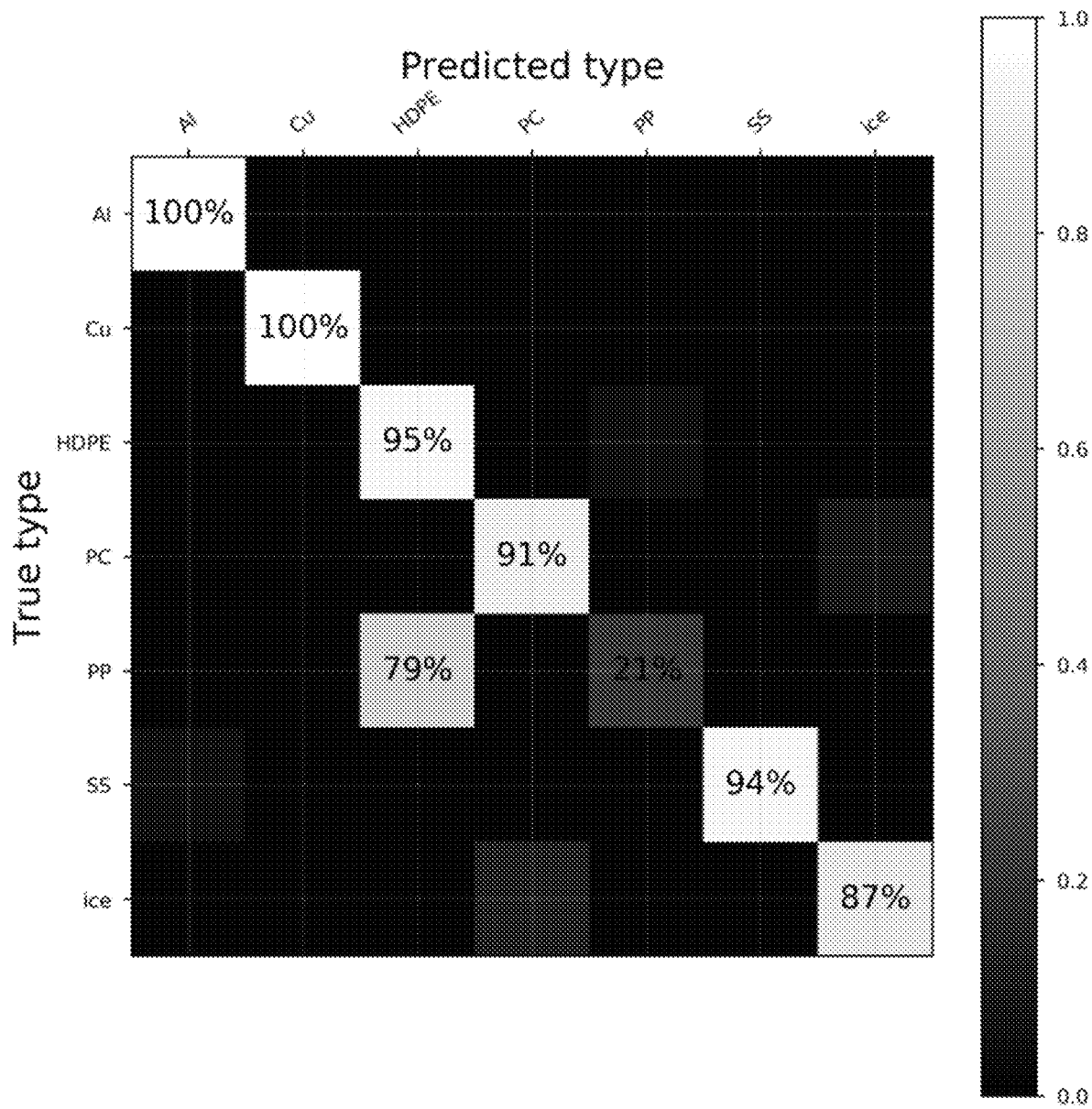
Figure 8:
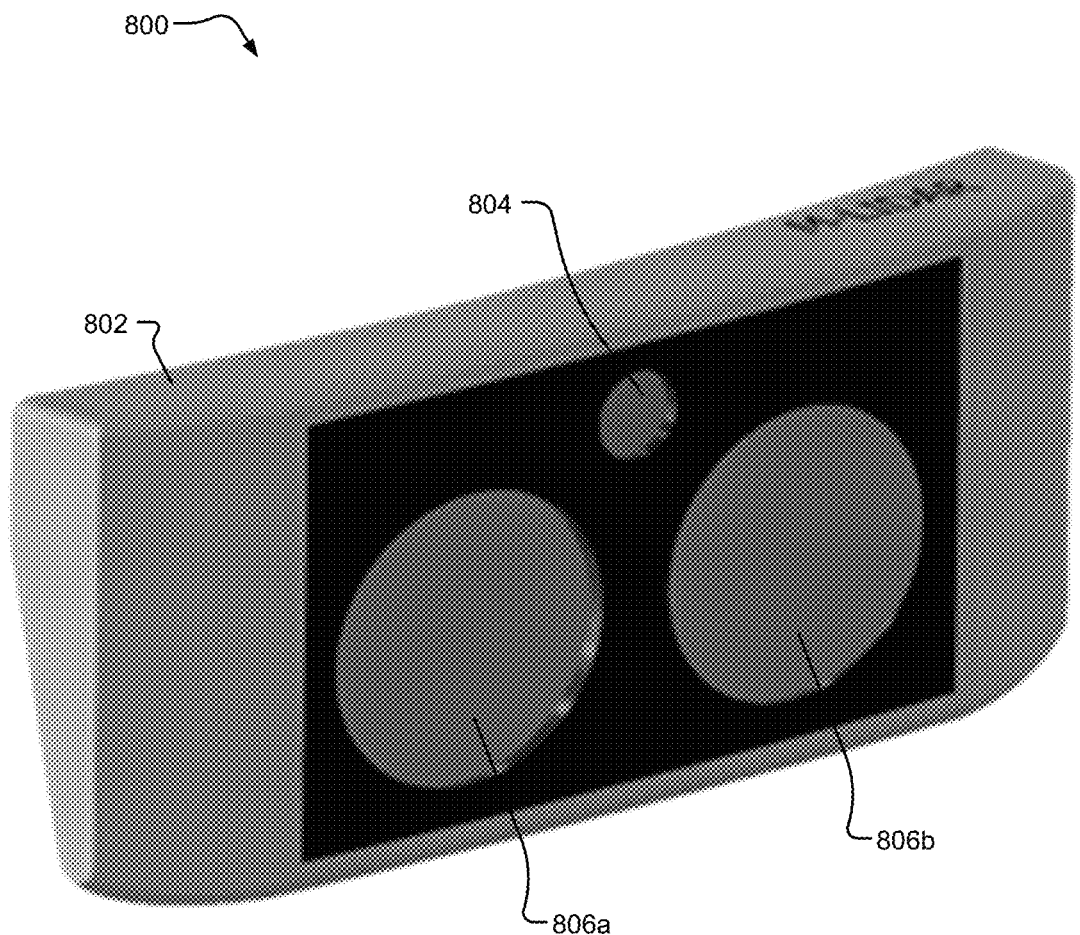
Figure 9:
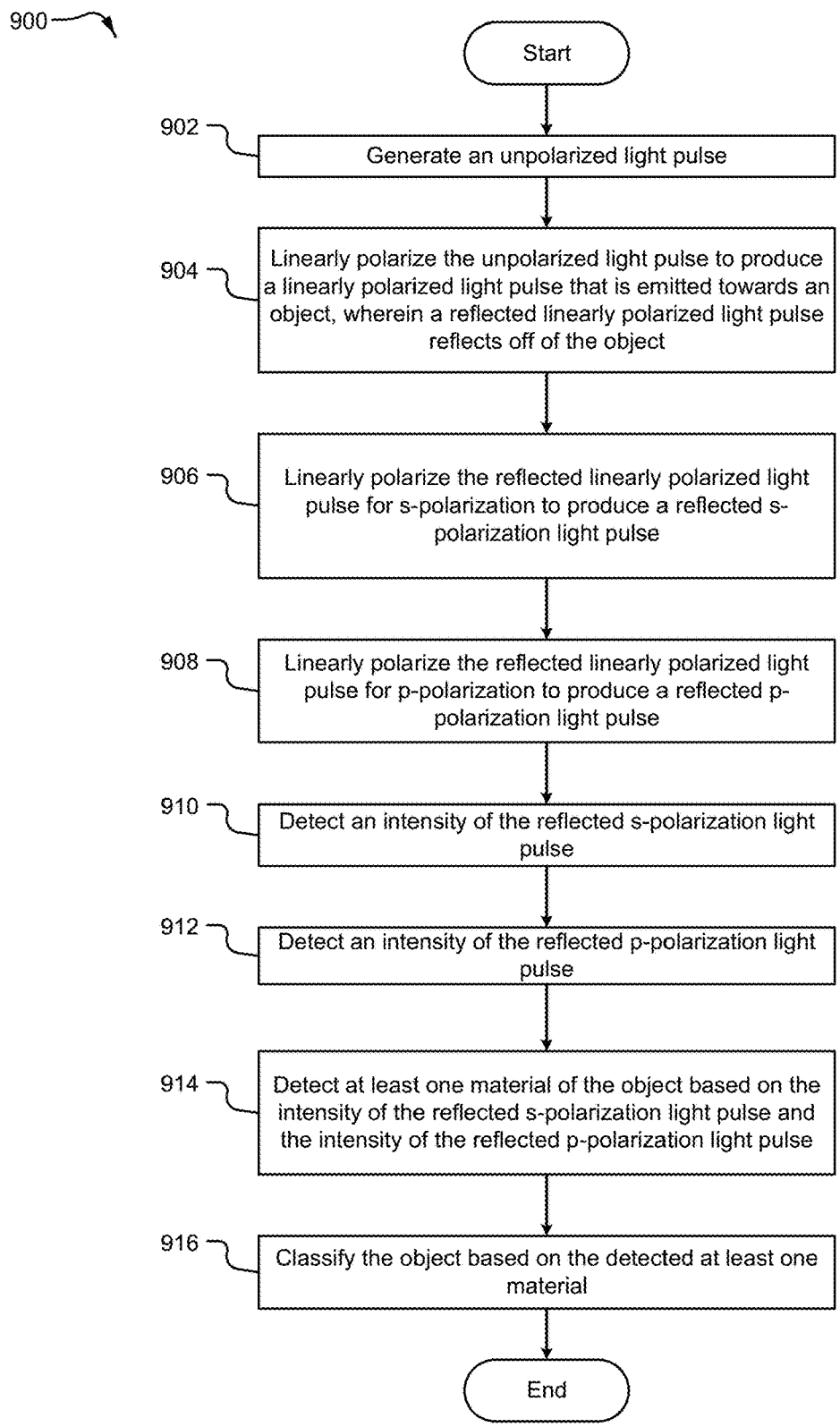
Figure 10:
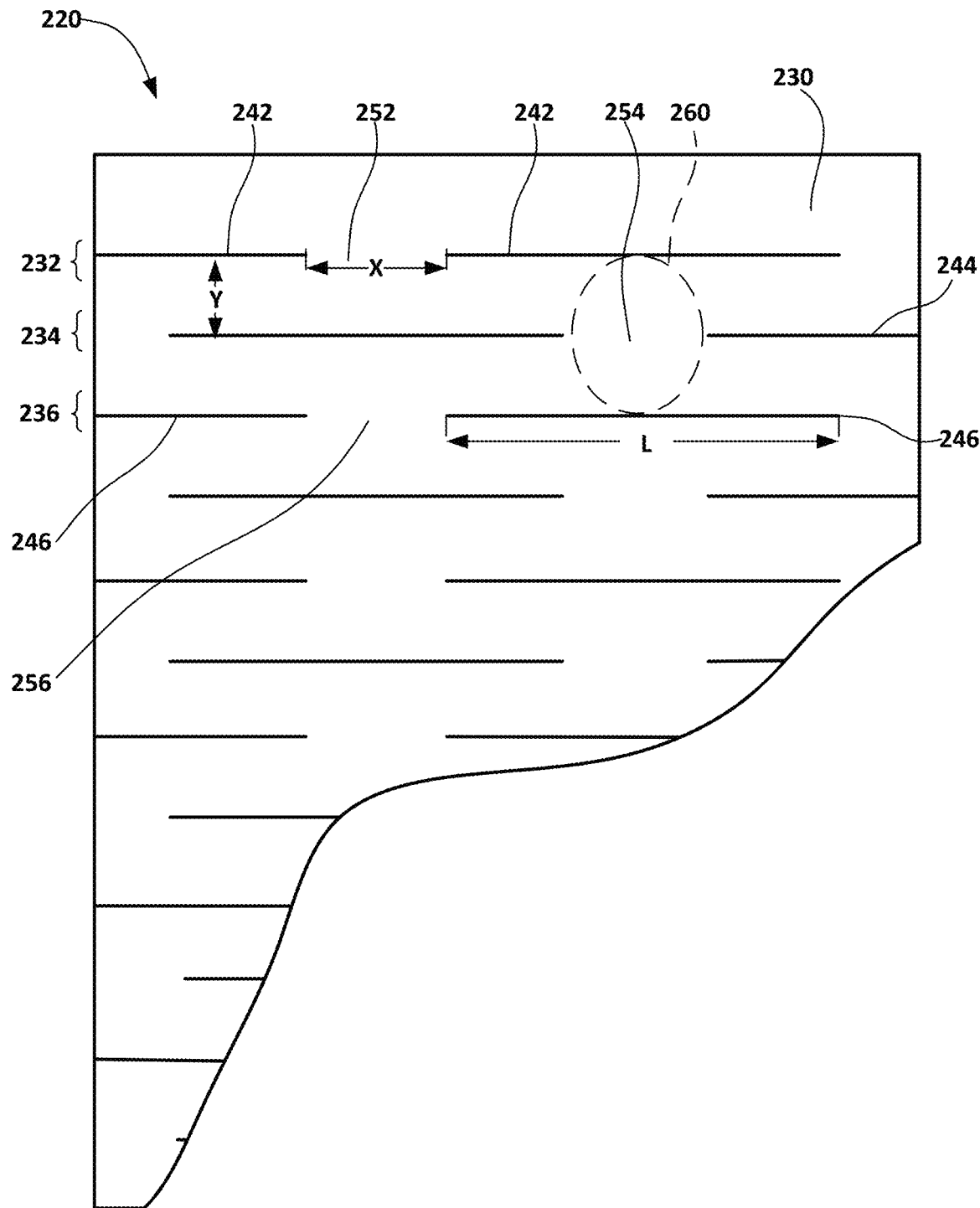
Figure 11:
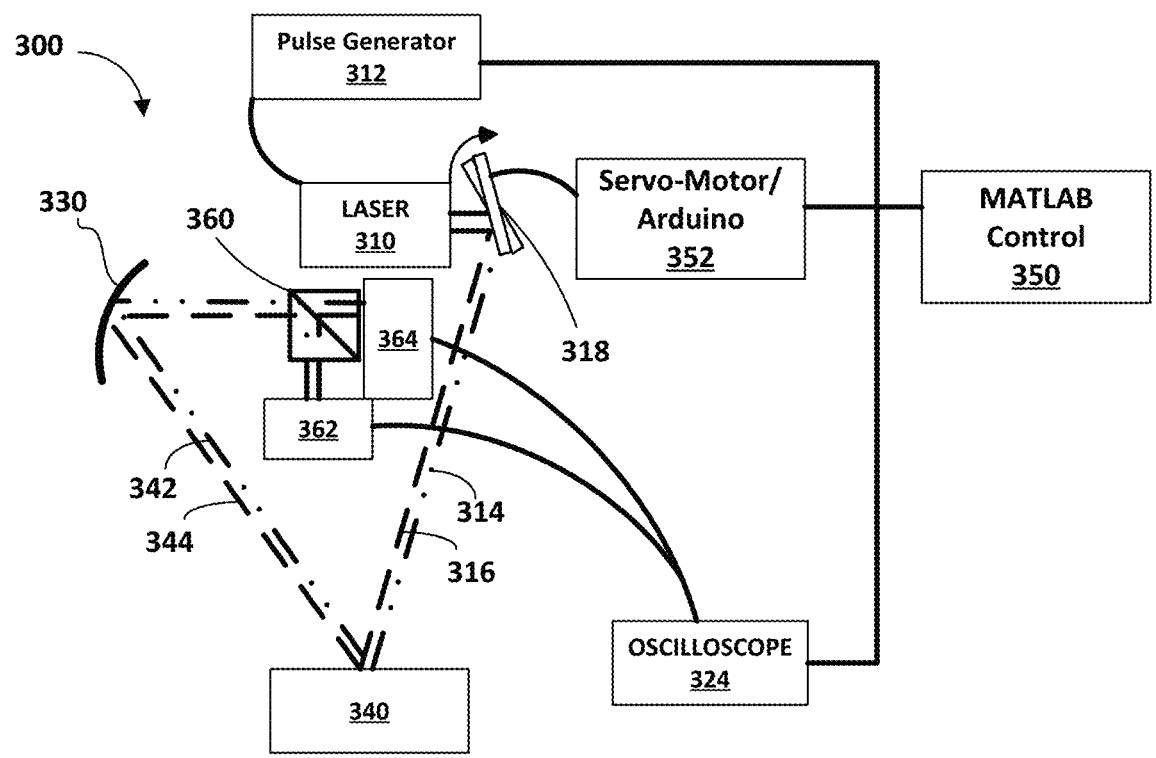

FIGS. 5a-5c illustrate a nano-kirigami nanocomposite optical element fabricated on a wafer according to certain aspects of the present disclosure. FIG. 5a shows a photograph of a nano-kirigami nanocomposite optical element, FIG. 5b shows an SEM image of the nano-kirigami nanocomposite optical element of FIG. 5a under 0% strain, while FIG. 5c illustrates a SEM image of the nano-kirigami nanocomposite optical element of FIG. 5a under 100% strain according to certain aspects of the present disclosure;

FIG. 6 illustrates a confusion matrix for MST using an artificial intelligence algorithm and polarization information according to certain aspects of the present disclosure;

FIG. 7 illustrates a confusion matrix for the detection of simulated black ice compared to other materials according to certain aspects of the present disclosure;

FIG. 8 illustrates one example of a black ice detection unit incorporating a M-LIDAR system according to certain aspects of the present disclosure;

FIG. 9 is a flowchart illustrating a method of performing object classification using an M-LIDAR system according to certain aspects of the present disclosure;

FIG. 10 is a schematic of a planar composite material having a representative plurality of kirigami cuts formed therein as a linear pattern; and FIG. 11 is a diagram illustrating an M-LIDAR system for mounting on a vehicle according to certain aspects of the present disclosure.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

The present disclosure provides LIDAR systems and methods configured to detect not only an object's distance, but also the object's material composition. According to some examples, material composition classification may be achieved by virtue of polarization analysis processed using machine learning algorithms.

The optical elements of the system described herein may be configured to bring all of the light emitted from a light source (e.g., a laser) to a known polarization state, such that the shift in polarization can be accurately measured later on. This light then travels until it reaches an object interface (the object being composed of one or more materials), at which point a portion of the light will be diffusely reflected back.

This disclosure describes, among other things, a new method of perception of surroundings by creating semantic maps of 3D space with the addition of materials and surface texture (MST) classification at each point of the LIDAR cloud. The MST classification inferred from the polarization signature of the returned photons may reduce the ambiguity of 3D point clouds and facilitate the recognition of various objects (metal points, glass points, rough dielectric points, etc.). The polarization classification may precede the surface tangent plane estimation and, therefore, may pre-identify the objects by grouping the points with similar polarization signatures. LIDARs that are equipped with MST classification will be referred to herein as M-LIDARs.

According to one example of the instant disclosure, the M-LIDAR technology may be configured to be lightweight and conformable through the use of kirigami optics, rather than conventional, bulky optics, such as near-infrared optics and the like. According to one example, the M-LIDAR systems and methods described herein may be used in the detection of black ice for vehicles with different degree of automation.

Figure 1:
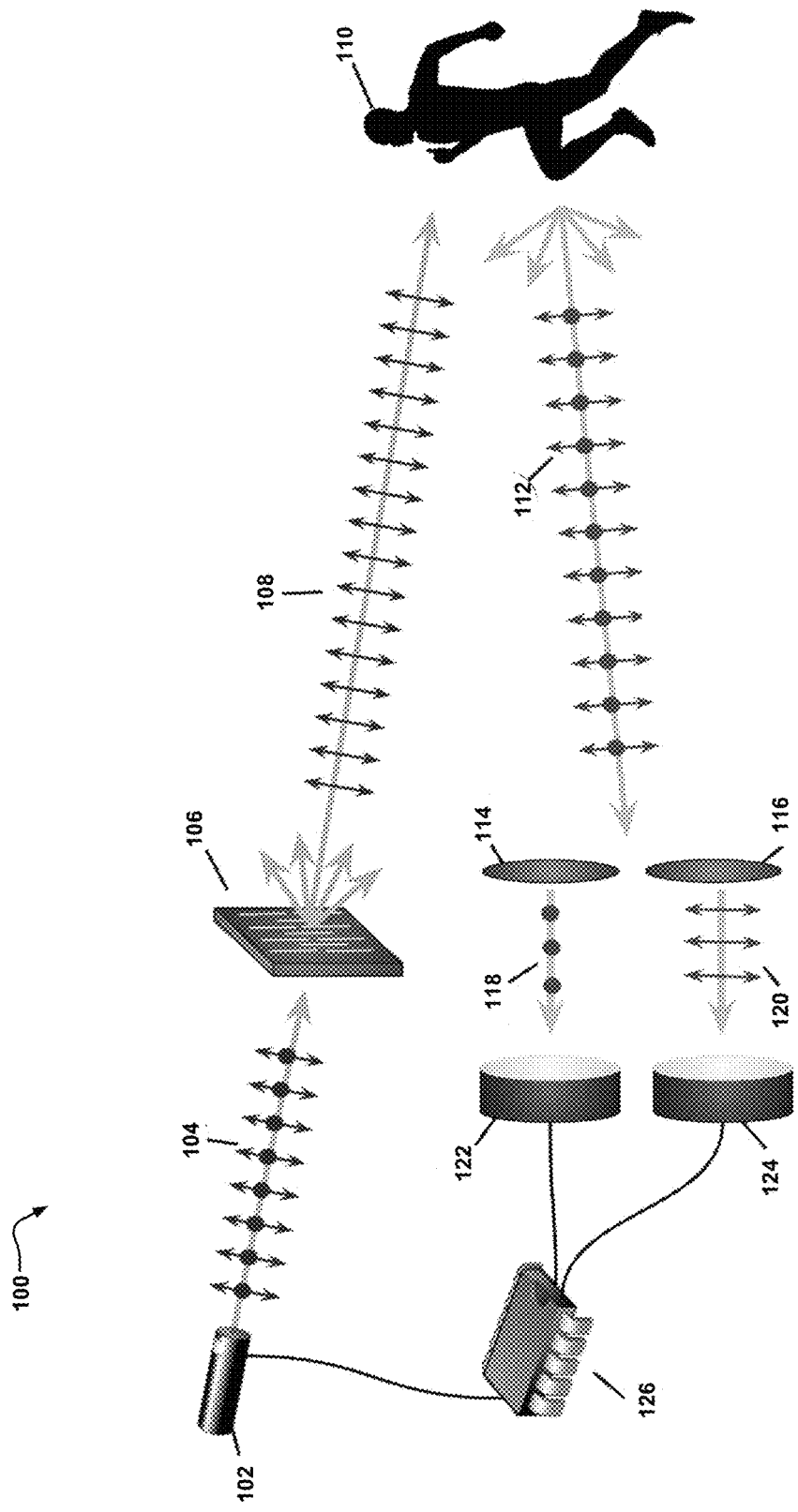
FIG. 1 is a functional diagram illustrating an M-LIDAR system according to certain aspects of the present disclosure.

Referring now to FIG. 1, a representative simplified M-LIDAR system 100 is provided. The M-LIDAR system 100 may include a laser 102, a beam steerer 106, a first polarizer 114, a second polarizer 116, a first polarization detector 122, a second polarization detector 124, and a processor 126. Although FIG. 1 illustrates first and second polarizers 114, 116 and first and second polarization detectors 122, 124, according to some implementations, only a single polarizer (e.g., the first polarizer 114) and a single polarization detector (e.g., the first polarization detector 122) may be included as part of the system 100 without departing from the teachings of the present disclosure. Furthermore, according to certain examples, more than two polarizers and/or more than two polarization detectors may be included as part of the system 100 without departing from the teachings herein.

For purposes of simplicity and illustration, throughout the remainder of this disclosure the first polarizer 114 will be treated as a s-polarization linear polarizer 114. Similarly, for purposes of simplicity and illustration, the second polarizer 116 will be treated as a p-polarization linear polarizer 116. Further, the first polarization detector 122 will be treated as a p-polarization detector 122 and the second polarization detector will be treated as a s-polarization detector 124.

However, as will be appreciated by those having ordinary skill in the art, the polarizers 114, 116 may be configured for a variety of different types of polarization without deviating from the teachings herein. For example, a given polarizer may be configured to perform linear polarization (e.g., s or p type linear polarization), right-circular polarization, left-circular polarization, elliptical polarization, or any other suitable type of polarization known in the art. Similarly, a given detector may be configured to detect linearly-polarized light (e.g., s or p type linearly polarized light), right-circular polarized light, left-circular polarized light, elliptically-polarized light, or any other type of polarized light known in the art. According to some examples, the polarization of a light beam (i.e., a combination of two or more light pulses) may be modulated from pulse to pulse to obtain additional information about one or more objects under consideration.

As discussed in additional detail below, the system 100 may be configured to detect one or more materials making up an object 110, and classify the object 110 based, at least in part, on the detected materials. According to some examples, the object classification may be performed using one or more artificial intelligence algorithms including, but not limited to, neural network-based artificial intelligence.

In operation, the system 100 may function as follows. The laser 102 may be configured to generate (i.e., emit) one or more polarized or unpolarized light pulses, the one or more polarized or unpolarized light pulses collectively forming a polarized/unpolarized light beam 104. According to the example shown in FIG. 1, each pulse includes an s-polarization component (represented by the dots along the beam 104 in FIG. 1) and a transverse p-polarization component (represented by the double-sided arrows running in a perpendicular direction through the beam 104 in FIG. 1). Alternatively (and in conjunction with the preceding discussion on different types of polarized light), the pulses may include, for example, left and right circularly polarized sequences, elliptically polarized sequences, any combination of the foregoing, or any other suitably polarized light sequences.

According to some examples, the laser 102 may be configured to generate anywhere from one, to over one million, pulses a second. Furthermore, according to some implementations, the laser 102 may constitute a 550 nanometer (nm), 808 nm, 905 nm, or 1550 nm pulsed laser—or any other suitable wavelength of laser—without deviating from the teachings of the instant disclosure. For example, implementations for home robotics, autonomous vehicles, and machine vision may employ lasers having eye-safe frequencies above 800 nm. For outdoor applications, light beams in the water transparencies windows—around 900 nm to 1550 nm, for example—may be suitably employed. According to some implementations, upon a given pulse being generated by the laser 102, the processor 126—executing executable instructions—may record the initial time that the pulse is generated. This "time-of-flight" information may be subsequently utilized to calculate a distance to the object 110 by using the speed of light.

The beam 104 may be directed by the laser 102 through the beam steerer 106. The beam steerer 106 may be configured to produce a polarization-adjusted light pulse. In certain aspects, a polarization of each polarized/unpolarized pulse of the polarized/unpolarized light beam 104 is adjusted by the beam steerer 106. As used herein, adjusting a polarization may include imparting a polarization or changing a polarization. Thus, the beam steerer 106 may adjust a polarization of each polarized/unpolarized pulse of the polarized/unpolarized light beam 104 to produce one or more linearly polarized light pulses (the linearly polarized light pulses collectively forming a linearly polarized light beam 108). While the foregoing example contemplates linear polarization, the beam steerer 106 may, according to some examples, circularly (e.g., left or right) or elliptically polarize the beam 104. According to another example, the beam steerer 106 may not apply any polarization to the beam at all. For example, if the beam 104 is already polarized as it enters the beam steerer 106, the beam steerer 106 may further modify the properties of the polarization-adjusted light pulse produced (e.g., split or modulate the pulses), but may not need to adjust the polarity of the previously polarized light pulse. Further still, according to some examples, the beam steerer 106 may polarize a first pulse of a beam according to a first type of polarization and polarize a second pulse of the same beam according to a second, different type of polarization. In addition to, or as an alternative to, performing polarization of the beam 104, the beam steerer 106 may also control the direction of any beam (e.g., beam 108) emitted therefrom. Further still, the beam steerer 106 may split a beam (e.g., beam 104) into several different beams, whereby one or more of the beams are emitted a defined angles, to steer multiple beams at a time. This concept is illustrated in FIG. 1 with regard to the many diverging arrows emanating from the beam steerer 106.

In addition, or alternatively, in some examples, the beam steerer 106 may be configured to modulate the linearly polarized light beam 108. In one example, the beam steerer 106 may include a kirigami nanocomposite beam steerer or the like. According to this example, and as discussed in additional detail below, the beam steerer 106 may be configured to linearly polarize and/or modulate the linearly polarized light beam 108 by increasing or decreasing an amount of strain applied to the kirigami nanocomposite beam steerer.

Furthermore, according to one example, the beam steerer 106 may be configured to linearly polarize each unpolarized pulse of the unpolarized light beam 104 by linearly polarizing each unpolarized pulse of the unpolarized light beam 104 for p-polarization. This example is illustrated in FIG. 1 where it can be seen that the beam 104, after passing through the beam steerer 106, no longer includes any s-polarization components (i.e., "dot" components shown in beam 104 are absent in linearly polarized light beam 108). In alternative aspects, the linearly polarized light beam 108 may instead be p-polarized. Further, in certain aspects, the beam steerer 106 may modify, control, and steer the linearly polarized light beam 108 emitted towards object 110, as will be discussed further herein. The beam steerer 106 may enable dynamic, wavelength-dependent beam steering and amplitude modulation of electromagnetic waves.

Continuing with FIG. 1, the linearly polarized light beam 108 may be diffusively reflected off the object 110. One or more pulses of light collectively form a beam 112 that constitutes a reflected version of the linearly polarized light beam 108. According to some examples, the reflected linearly polarized light beam 112 may have a different polarization than the linearly polarized light beam 108 (i.e., the beam pre-reflection off of the object 110). This difference in status is illustrated by virtue of the beam 112 including both p-polarization and s-polarization components (reflected, respectively, by the dots and double-sided arrows along the path of the beam 112), whereas the beam 108 only is shown to include p-polarization components. Further, the object 110 may include any suitable object (or target) made up of one or more different materials of which detection is desired. Although discussed above and in the sections that follow as being a reflected "linearly" polarized light beam 112, according to certain examples, the reflected beam 112 may be polarized in a variety of different ways, including circularly or elliptically, without deviating from the teachings herein.

The reflected linearly polarized light beam 112 diffusively reflected off, scattered off of, or otherwise emitted by the object 112 may pass through the s-polarization linear polarizer 114 and/or the p-polarization linear polarizer 116 of the system 100. In certain aspects, respective portions of the reflected, scattered, or otherwise emitted linearly polarized light beam 112 passes through both the s-polarization linear polarizer 114 and/or the p-polarization linear polarizer 116 of the system 100. The s-polarization linear polarizer 114 is configured to linearly polarize the one or more light pulses making up the beam 112 for s-polarization to produce one or more reflected s-polarization light pulses (the one or more reflected s-polarization light pulses collectively forming a reflected s-polarization light beam 118). Similarly, the p-polarization linear polarizer 116 is configured to linearly polarize the one or more light pulses making up the beam 112 for p-polarization to produce one or more reflected p-polarization light pulses (the one or more reflected p-polarization light pulses collectively forming a reflected p-polarization light beam 120). According to some examples, the s-polarization linear polarizer 114 and/or the p-polarization linear polarizer 116 may include a kirigami nanocomposite or the like, such as kirigami nanocomposites of the types discussed above with regard to the beam steerer 106 and/or below with regard to FIGS. 4*a*-4*d* and 5*a*-5*c*. However, those having ordinary skill in the art will recognize that non-kirigami nanocomposites or other optic devices may be employed as part of the system 100, according to some examples, without deviating from the teachings herein.

Similar arrangements of polarizers 114, 116 may be utilized, according to some examples, for the polarization of left and right circularly polarized light or elliptically polarized light reflected, scattered or otherwise emitted off/from the object 110.

An s-polarization detector 122 may be configured to detect an intensity of each of the one or more reflected s-polarization light pulses forming the reflected s-polarization light beam 118. In addition, according to some implementations, the s-polarization detector 122 may be configured to detect an angle of incidence associated with the reflected s-polarization light beam 118. The detected intensity of the one or more reflected s-polarization light pulses forming the reflected s-polarization light beam 118 and/or the detected angle of incidence associated with the reflected s-polarization light beam 118 may be utilized by the processor 126 to perform material type detection (using, for example, MST classification), as discussed in additional detail below.

Similarly, a p-polarization detector 124 may be configured to detect an intensity of each of the one or more reflected p-polarization light pulses forming the reflected p-polarization light beam 120. In addition, according to some implementations, the p-polarization detector 124 may be configured to detect an angle of incidence associated with the reflected p-polarization light beam 120. The detected intensity of the one or more reflected p-polarization light pulses forming the reflected p-polarization light beam 120 and/or the detected angle of incidence associated with the reflected p-polarization light beam 120 may also be utilized by the processor 126 to perform material type detection, as discussed in additional detail below.

The processor 126 is configured to detect at least one material of the object 110 based on (i) the detected intensities of the one or more light pulses forming beams 118 and/or 120 and/or (ii) the detected angles of incidence associated with the reflected s-polarization light beam 118 and/or the reflected p-polarization light beam 120. More specifically, according to some examples, the processor 126 is configured to apply machine-learning algorithms to detect the one or more materials making up the object 110. As used herein, "applying a machine-learning algorithm" may include, but is not limited to, executing executable instructions stored in memory and accessible by the processor. In addition, according to one example, the specific machine-learning algorithm used for material detection may include an artificial neural network. However, other machine-learning algorithms known in the art may be suitably employed without deviating from the teachings of the instant disclosure.

Furthermore, according to some examples, the processor 126 may be configured to classify the object 110 based on the detected material(s) of the object 110 by applying a machine-learning algorithm. Again, the machine learning algorithm used for object classification may include an artificial neural network. However, other machine-learning algorithms known in the art may be suitably employed without deviating from the teachings of the instant disclosure.

Before turning to FIG. 2, the following reflects an overview of the process for detecting the material(s) of an object utilizing a M-LIDAR system, such as the system 100 shown in FIG. 1

As noted above, one aim of the instant disclosure is to enable the detection of object materials and to reduce the data processing necessary for modern LIDAR devices by obtaining more data at each point in the point cloud. This additional polarization data, when combined with machine learning algorithms, enables material detection, which simplifies object recognition for a variety of applications including, but not limited to, autonomous vehicles, machine vision, medical applications (e.g., devices to assist the blind), and advanced robotics.

An M-LIDAR system according to example implementations of the instance disclosure may operate as follows. The pair of detectors (e.g., detectors 122, 124) with perpendicularly oriented linear polarizers (e.g., polarizers 114, 116) may be used to measure the return light (e.g., the one or more pulses of light constituting the reflected version of the linearly polarized light beam 112). Some of the diffusely backscattered light (e.g., reflected light 112) may be directed at the detectors (e.g., detectors 122, 124) and pass through the narrow band interference filters (e.g., linear polarizers 114, 116) placed in front of each detector pair (e.g., detector pair 122/124). The narrow band interference filters may only allow a small range of wavelengths to pass through (e.g., 1-2 nm), which may reduce undesired noise from ambient lighting or external sources.

According to other examples of the foregoing system, the system may be configured to detect, and perform machine-learning processing upon, circularly and/or elliptically polarized light reflected, scattered, or otherwise emitted by an object.

Due to this selectivity, an M-LIDAR system in accordance with the present disclosure (e.g., system 100) may be configured to simultaneously measure multiple wavelengths, completely independently. The coherent light may then be polarized using, for example, a co-polarizer and/or cross-polarizer. The intensity of light may decrease by some amount as it travels through the polarizers, depending on the shift in polarization upon reflecting off of the object (e.g., object 110). Beam focusing optics (e.g., polarizers 114, 116) may direct the coherent, polarized light (e.g., beams 118, 120) towards the detection surface (e.g., the surfaces of detectors 122, 124), and the angle from which the returned light travelled (i.e., the angle(s) of incidence) can be detected based on the location the light strikes on the detection screen.

Once the detectors identify light, the time-of-flight sensor (e.g., the time of flight sensor implemented in the processor 126) may record the travel time of that light pulse. Each light pulse may have its intensity measured for both the co-polarized and cross-polarized detectors, and these two values in combination allow the polarization effects caused during the reflection to be quantified.

Following this process, the following parameters may be detected: (i) initial angle(s) at which the beam was steered; (ii) angle(s) from which the backscattered light returns; (iii) the time-of-flight from emission to detection; and (iv) the intensity at each detector.

Note that due to the detectors being at different locations, a single pulse of light may take a slightly different amount of time to reach each detector. By understanding the system geometry as well as the relationship between intensity and distance, this difference can be compensated for and the intensity at one detector precisely adjusted. The time-of-flight data may be used to determine the distance between the source (e.g., the laser 102) and the object (e.g., the object 110), and—in conjunction with the initial and return angle—the specific location of that point in space, relative to the M-LIDAR system, can be determined. These compensated intensity values may contain information indicative of the material off of which the light pulse reflected. Making use of these values, machine learning algorithms may provide robust and comprehensive material recognition capabilities.

The process described above of emitting a pulse of light, the light diffusely reflecting off an object, the reflected light being measured by the detectors, and the location of the object relative to the source being determined may be repeated on the order of one to millions of times per second. A point is generated each time, and these points are mapped onto the same coordinate system to create a point cloud.

Once the point cloud is generated, one or more machine learning algorithms may be used to cluster points into objects, and ultimately characterize the respective material(s) of each object (e.g., where a plurality of objects is detected). Points may be clustered based on, for example, one or more values of the measured intensities, also, in some examples, based on proximity of similar points.

Once a cluster is determined using intensity values, a machine learning algorithm may be used to correlate the measured value to a database of known materials to classify the material of that cluster of points. This process may be repeated for all clusters in the system. An understanding of surrounding materials enables the system (e.g., as implemented in an automobile, robot, drone, etc.) to make faster, more educated decisions about what the objects themselves might be. From there, factors such as risk involved can be assessed and decisions can be subsequently made (e.g., in the case of the system detecting black ice ahead of a vehicle). As the process continues over time, more information can be extracted from changes perceived and an even better understanding of the surroundings developed.

The MST classification technology is also applicable to the detection of an object whose surface is modified to enhance detection, for example, that is painted or textured with a macroscale, microscale, nanoscale, or molecular pattern to produce the reflected beams with the specific optical response adapted to the fast MST classification by LIDARs. Examples of such surface treatment include paints containing additives that produce reflected, scattered or otherwise emitted light with specific linear, circular, or elliptical polarization. In one instance, metal nano/micro/macro wires or axial carbon nanomaterials are added to the base paint. An alignment pattern can be random, linear, spiral, herring-bone or any other pattern that produces the specific polarization signature enabling fast identification of a specific object. By way of non-limiting example, this may be used for creating markers on roads, road signs, barriers, pylons, guard rails, vehicles, bicycles, clothing, and other objects.

Another implementation of surface treatment facilitating MST classification may include the addition of chiral inorganic nanoparticles to base paint used to coat such objects described above, such as road markers, vehicles, bicycles, clothing, etc. The chiral nanoparticles may display a specific and very strong circular polarization response to the beams used by the LIDARs. They can be mixed in the paint with a specific ratio to create polarization signatures (e.g., "barcodes") for specific objects.

Another example of polarization tagging of an object may include using surface texturing that creates a particular polarization response. One example of such texturing may include creating nanoscale patterns of metal, semiconductor, insulating or ceramic nanoparticles with specific geometrical characteristics resulting in a defined polarization response to the laser in LIDARs. Two examples of such patterns include (a) linear nanoscale or microscale surface features that result in a linear polarization of the reflected, scattered, or emitted light from an object and (b) out-of-plane protruding chiral patterns on the metal surfaces resulting in a specific chirality and therefore circular polarization of the reflected, scattered, or emitted light from an object.

According to some examples, the foregoing system and method may be employed to accurately recognize materials for use in autonomous vehicles, machine learning, medical applications, and advanced robotics.

Existing, conventional LIDAR systems primarily work via measurement of the distance between an object and the laser source, typically using either time-of-flight data or phase shifts. In such cases, the objects are classified based on geometries and patterns in the arrangement of points in the cloud. Some more advanced LIDAR point cloud classification methods make use of an additional parameter: overall intensity.

Based on how strong the signal of the returning light pulse is, a system can effectively detect differences in color. This additional piece of data makes it easier to recognize object boundaries within point clouds, decreasing the amount of processing required to classify all points. However, applications like autonomous vehicles may require a higher degree of certainty, which overall intensity cannot achieve. Furthermore, the detection of objects at long distances may be achieved with a single point detection taking advantage of MST classification, rather than multiple point detection and processing of the type employed in conventional LIDAR systems.

Accordingly, the method described herein changes the approach machine vision currently takes towards object recognition. Instead of solely relying on geometry, movement, and color to determine the identity of an object, the system described herein takes into account yet another parameter: polarization. Upon reflecting off of a material interface, light experiences some change in polarization. This polarization change is quantified by measuring the intensities of light after having passed through both co-polarized and cross-polarized filters. This additional data may be paired with machine learning approaches to significantly improve clustering, and by extension, object recognition capabilities. Traditional object recognition methods are quite computationally expensive. The approach described herein may significantly reduce the processing power required by LIDAR by using a material-based approach rather than the current, geometry-based approach.

In addition to traditional distance measurements, the polarization data collected by the instant system allows machine learning algorithms to determine the material(s) from which an object is composed. Current LIDAR systems lack awareness or information about the materials in a surrounding environment. When achieved, such information provides context for greater situational understanding and smarter decisions. In the case of an autonomous vehicle, this enhanced understanding of the environment may lead to improved safety of the passengers because accurate, timely detection of potential hazards produce improved decision-making capabilities.

Figure 2B:
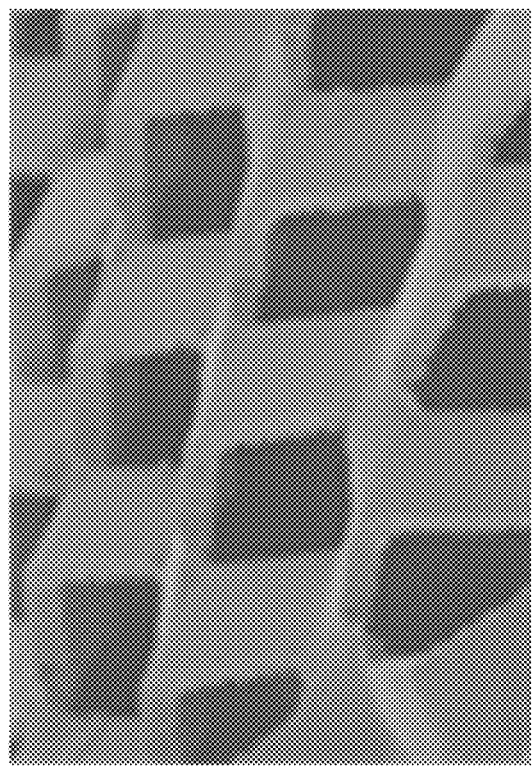
FIGS. 2a-2b are scanning electron microscope (SEM) images of nano-kirigami nanocomposite sheets configured for use in a M-LIDAR system according to certain aspects of the present disclosure.
Figure 2A:
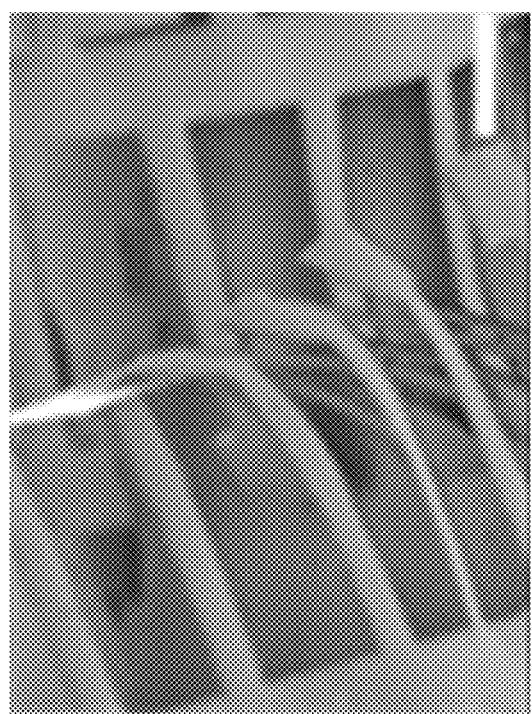

Turning now to FIGS. 2a-2b, scanning electron microscope (SEM) images of nano-kirigami sheets are shown that may be used to form the nano-kirigami nanocomposite optic components incorporated into an M-LIDAR system. The optically active kirigami sheets, such as those shown in FIGS. 2a-2b, may be manufactured from ultra-strong nanoscale composites with cut patterns of 0.5-5 μm in length, according to some examples of the present disclosure. In certain aspects, composite materials (including highly conductive composite materials) can be modified by using a concept from the ancient Japanese art of paper cutting known as "kirigami." The present disclosure thus provides a kirigami approach to engineer elasticity by using a plurality of cuts or notches that create a network on a planar polymeric material, such as a composite or nanocomposite material. Such cuts (extending from one side to the other of the material, for example, in a polymeric or composite material) can be made by top-down patterning techniques, such as photolithography, to uniformly distribute stresses and suppress uncontrolled high-stress singularities within the polymeric or nanocomposite material. This approach can prevent unpredictable local failure and increases the ultimate strain of rigid sheets from 4% to 370%, by way of non-limiting example.

By using microscale kirigami patterning, a stiff nanocomposite sheet can acquire high extensibility. Moreover, kirigami cut-patterned composite sheets maintain their electrical conductance over the entire strain regime, in marked contrast to most stretchable conductive materials. The kirigami structure may comprise a composite, such as a nanocomposite. In certain aspects, the kirigami structure may be a multilayered structure having at least two layers, where at least one layer is a polymeric material. The polymeric material may be a composite or nanocomposite material. The composite material comprises a matrix material, such as a polymer, a polyelectrolyte, or other matrix (e.g., cellulose paper), and at least one reinforcement material distributed therein. In certain aspects, nanocomposite materials are particularly suitable for use in a kirigami structure, which is a composite material comprising a reinforcement nanomaterial, such as nanoparticles. The composite may be in the form of a sheet or film in certain variations.

A "nanoparticle" is a solid or semi-solid material that can have a variety of shapes or morphologies, however, which are generally understood by those of skill in the art to mean that the particle has at least one spatial dimension that is less than or equal to about 10 μm (10,000 nm). In certain aspects, a nanoparticle has a relatively low aspect ratio (AR) (defined as a length of the longest axis divided by diameter of the component) of less than or equal to about 100, optionally less than or equal to about 50, optionally less than or equal to about 25, optionally less than or equal to about 20, optionally less than or equal to about 15, optionally less than or equal to about 10, optionally less than or equal to about 5, and in certain variations, equal to about 1. In other aspects, a nanoparticle that has a tube or fiber shape has a relatively high aspect ratio (AR) of greater than or equal to about 100, optionally greater than or equal to about 1,000, and in certain variations, optionally greater than or equal to about 10,000.

In certain variations, a nanoparticle's longest dimension is less than or equal to about 100 nm. In certain embodiments, the nanoparticles selected for inclusion in the nanocomposite are electrically conductive nanoparticles that create an electrically conductive nanocomposite material. The nanoparticles may be substantially round-shaped nanoparticles, that have low aspect ratios as defined above, and that have a morphology or shape including spherical, spheroidal, hemispherical, disk, globular, annular, toroidal, cylindrical, discoid, domical, egg-shaped, elliptical, orbed, oval, and the like. In certain preferred variations, the morphology of the nanoparticle has a spherical shape. Alternatively, the nanoparticle may have an alternative shape, such as a filament, fiber, rod, a nanotube, a nanostar, or a nanoshell. The nanocomposite may also include combinations of any such nanoparticles.

Furthermore, in certain aspects, a particularly suitable nanoparticle for use in accordance with the present teachings has a particle size (an average diameter for the plurality of nanoparticles present) of greater than or equal to about 10 nm to less than or equal to about 100 nm. The conductive nanoparticles may be formed of a variety of conductive materials including metallic, semiconducting, ceramic, and/or polymeric nanoscale particles having plurality of shapes. The nanoparticles may have magnetic or paramagnetic properties. The nanoparticles may comprise conductive materials, such as carbon, graphene/graphite, graphene oxide, gold, silver, copper, aluminum, nickel, iron, platinum, silicon, cadmium, mercury, lead, molybdenum, iron, and alloys or compounds thereof. Thus, suitable nanoparticles can be exemplified by, but are not limited to, nanoparticles of graphene oxide, graphene, gold, silver, copper, nickel, iron, carbon, platinum, silicon, seedling metals, CdTe, CdSe, CdS, HgTe, HgSe, HgS, PbTe, PbSe, PbS, $MoS_2$, $FeS_2$, FeS, FeSe, $WO_{3-x}$, and other similar materials known to those of skill in the art. Graphene oxide is a particularly suitable conductive material for use as reinforcement in the composite. In certain variations, the nanoparticles can comprise carbon nanotubes, such as single walled nanotubes (SWNTs) or multi-walled nanotubes (MWNTs), for example. SWNTs are formed from a single sheet of graphite or graphene, while MWNTs include multiple cylinders arranged in a concentric fashion. The typical diameters of SWNT can range from about 0.8 nm to about 2 nm, while MWNT can have diameters in excess of 100 nm.

In certain variations, the nanocomposite may comprise a total amount of a plurality of nanoparticles of greater than or equal to about 1% by weight to less than or equal to about 97% by weight, optionally greater than or equal to about 3% by weight to less than or equal to about 95% by weight, optionally greater than or equal to about 5% by weight to less than or equal to about 75% by weight, optionally greater than or equal to about 7% by weight to less than or equal to about 60% by weight, optionally greater than or equal to about 10% by weight to less than or equal to about 50% by weight of a total amount of nanoparticles in the nanocomposite. Of course, appropriate amounts of nanoparticles in a composite material depend upon material properties, percolation thresholds, and other parameters for a particular type of nanoparticle in a specific matrix material.

In certain variations, the nanocomposite may comprise a total amount of a polymeric matrix material of greater than or equal to about 1% by weight to less than or equal to about 97% by weight, optionally greater than or equal to about 10% by weight to less than or equal to about 95% by weight, optionally greater than or equal to about 15% by weight to less than or equal to about 90% by weight, optionally greater than or equal to about 25% by weight to less than or equal to about 85% by weight, optionally greater than or equal to about 35% by weight to less than or equal to about 75% by weight, optionally greater than or equal to about 40% by weight to less than or equal to about 70% by weight of a total amount of matrix material in the nanocomposite.

In certain variations, the nanocomposite material comprises a plurality of electrically conductive nanoparticles and has an electrical conductivity of greater than or equal to about $1.5 \times 10^3$ S/cm. In certain other aspects, the nanocomposite material may comprise a plurality of electrically conductive nanoparticles as a reinforcement nanomaterial and thus may have an electrical resistivity of less than or equal to about $1 \times 10^{-4}$ Ohm·m. In certain other variations, an impedance (Z) of the electrically conductive nanocomposite comprising a plurality of nanoparticles may be less than or equal to about $1 \times 10^4$ Ohms (e.g., measured using an AC sinusoidal signal of 25 mV in amplitude with impedance values measured at a frequency of 1 kHz).

The polymeric or nanocomposite material may be in a planar form, such as a sheet, in an initial state (prior to being cut), but may be folded or shaped into a three-dimensional structure and thus used as a structural component after the cutting process. By way of example, a structure 220 including a portion of an exemplary nanocomposite material sheet 230 having a surface with tessellated cut pattern is shown in FIG. 10. Sheet 230 includes a first row 232 of first discontinuous cuts 242 (that extend through the sheet 230 to create an opening) in a pattern that defines a first uncut region 252 between the discontinuous cuts 242. A discontinuous cut is a partial or discrete cut formed in the sheet that leaves the entire sheet intact in its original dimensions, rather than being divided into separate smaller sheets or portions. If multiple discontinuous cuts 242 are present, at least some of them are noncontiguous and unconnected with one another so that at least one uncut region remains on the sheet as a bridge between the discontinuous sheets. While many cut patterns are possible, a simple kirigami pattern of straight lines in a centered rectangular arrangement as shown in FIG. 10 is used herein as an exemplary pattern. The first uncut region 252 has a length "x." Each discontinuous cut 242 has a length "L."

In certain aspects, the length of each discontinuous cut (e.g., discontinuous cut 242) may be on the micro- meso-, nano- and/or macroscales. Macroscale is typically considered to have a dimension of greater than or equal to about 500 μm (0.5 mm), while mesoscale is greater than or equal to about 1 μm (1,000 nm) to less than or equal to about 500 μm (0.5 mm). Microscale is typically considered to be less than or equal to about 100 μm (0.5 mm), while nanoscale is typically less than or equal to about 1 μm (1,000 nm). Thus, conventional mesoscale, microscale, and nanoscale dimensions may be considered to overlap. In certain aspects, the length of each discontinuous cut may be on a microscale, for example, a length that is less than about 100 μm (i.e., 100,000 nm), optionally less than about 50 μm (i.e., 50,000 nm), optionally less than about 10 μm (i.e., 10,000 nm), optionally less than or equal to about 5 μm (i.e., 5,000 nm), and in certain aspects less than or equal to about 1 μm (i.e., 1,000 nm). In certain aspects, the discontinuous cuts 42 may have a length that is less than about 50 μm (i.e., 50,000 nm), optionally less than about 10 μm (i.e., 10,000 nm), and optionally less than about 1 μm (i.e., less than about 1,000 nm).

In certain other variations, these dimensions can be reduced by at least 100 times to a nanoscale, for example a cut having a length of less than or equal to about 1 μm (1,000 nm), optionally less than or equal to about 500 nm, and in certain variations, optionally less than or equal to about 100 nm.

It should be noted that "x" and "L" may vary within rows depending on the pattern formed, although in preferred aspects, these dimensions remain constant.

A second row 234 of second discontinuous cuts 244 is also patterned on the sheet 230. The second discontinuous cuts 244 define a second uncut region 254 therebetween. A third row 236 of third discontinuous cuts 246 is also patterned on the sheet 230. The third discontinuous cuts 246 define a third uncut region 256 therebetween. It should be noted that the first row 232, second row 234, and third row 236 are used for exemplary and nominative purposes, but as can be seen, the tessellated pattern on the surface of sheet 230 has in excess of three distinct rows. The first row 232 is spaced apart from the second row 234, as shown by the designation "y." The second row 234 is likewise spaced apart from the third row 236. It should be noted that "y" may vary between rows, although in certain aspects, it remains constant between rows. Such spacing between rows may likewise be on a micro- meso-, nano- and/or macroscale, as described above.

Notably, the first discontinuous cuts 242 in the first row 232 are offset in a lateral direction (along the dimension/axis shown as "x") from the second discontinuous cuts 244 in the second row 234, thus forming a tessellated pattern. Likewise, the second discontinuous cuts 244 in the second row 234 are offset in a lateral direction from the third discontinuous cuts 246 in the third row 236. Thus, the first uncut region 252, second uncut region 254, and third uncut region 256 in each respective row cooperates to form a structural bridge 260 that extends from the first row 232, across second row 234, and to third row 236.

In this regard, the sheet 230 having the patterned tessellated surface with the plurality of discontinuous cuts (e.g., 242, 244, and 246) can be stretched in at least one direction (e.g., along the dimension/axis shown as "y" or "x"). The sheet 230 formed of a nanocomposite thus exhibits certain advantageous properties, including enhanced strain.

In various aspects, an optic device incorporating a stretchable multilayered polymeric or composite material formed by a kirigami process is contemplated. By "stretchable" it is meant that materials, structures, components, and devices are capable of withstanding strain, without fracturing or other mechanical failure. Stretchable materials are extensible and thus are capable of stretching and/or compression, at least to some degree, without damage, mechanical failure or significant degradation in performance.

"Young's modulus" is a mechanical property referring to a ratio of stress to strain for a given material. Young's modulus may be provided by the expression:

$$E = \frac{(\text{stress})}{(\text{strain})} = \frac{\sigma}{\epsilon} = \frac{L_o}{\Delta L} \times \frac{F}{A}$$

where engineering stress is σ, tensile strain is ϵ, E is the Young's modulus, $L_0$ is an equilibrium length, ΔL is a length change under the applied stress, F is the force applied and A is the area over which the force is applied.

In certain aspects, stretchable composite materials, structures, components, and devices may undergo a maximum tensile strain of at least about 50% without fracturing; optionally greater than or equal to about 75% without fracturing, optionally greater than or equal to about 100% without fracturing, optionally greater than or equal to about 150% without fracturing, optionally greater than or equal to about 200% without fracturing, optionally greater than or equal to about 250% without fracturing, optionally greater than or equal to about 300% without fracturing, optionally greater than or equal to about 350% without fracturing, and in certain embodiments, greater than or equal to about 370% without fracturing.

Stretchable materials may also be flexible, in addition to being stretchable, and thus are capable of significant elongation, flexing, bending or other deformation along one or more axes. The term "flexible" can refer to the ability of a material, structure, or component to be deformed (for example, into a curved shape) without undergoing a permanent transformation that introduces significant strain, such as strain indicating a failure point of a material, structure, or component.

Thus, the present disclosure provides in certain aspects, a stretchable polymeric material. In further aspects, the present disclosure provides a stretchable composite material that comprises a polymer and a plurality of nanoparticles or other reinforcement materials. The polymer may be an elastomeric or thermoplastic polymer. One suitable polymer includes polyvinyl alcohol (PVA), by way of non-limiting example.

For example, for certain materials, creating the surface having patterned kirigami cuts in accordance with certain aspects of the present disclosure can increase ultimate strain of initially rigid sheets to greater than or equal to about 100% from an initial ultimate strain prior to any cutting, optionally greater than or equal to about 500%, optionally greater than or equal to about 1,000%, and in certain variations, optionally greater than or equal to about 9,000%.

Notably, a wide range of maximum attainable strains or expansion levels can be achieved based on the geometry of the cut pattern used. The ultimate strain is thus determined by the geometry. The ultimate strain (% strain) is a ratio between a final achievable length, while being stretched to a point before the structure breaks, over the original or initial length ($L_i$):

$$\% \text{ strain} = \frac{\Delta L}{L_i} = \frac{L_c - x - 2y}{2y}$$

where $L_c$ is a length of the cut, x is spacing between discontinuous cuts, and y is distance between discrete rows of discontinuous cuts. Thus, in certain variations, the polymeric materials, such as nanocomposites, having a surface with patterned cuts in accordance with certain aspects of the present disclosure can increase ultimate strain to greater than or equal to about 100%, optionally greater than or equal to about 150%, optionally greater than or equal to about 200%, optionally greater than or equal to about 250%, optionally greater than or equal to about 300%, optionally greater than or equal to about 350%, and in certain variations, optionally greater than or equal to about 370%. Additional discussion on kirigami composite materials and methods of making them are described in U.S. Publication No. 2016/0299270 filed as U.S. application Ser. No. 15/092,885 filed on Apr. 7, 2016 to Kotov et al. entitled "Kirigami Patterned Polymeric Materials and Tunable Optic Devices Made Therefrom," the relevant portions of which are incorporated herein by reference.

In certain aspects, the kirigami nanocomposites can form tunable optical grating structures that can maintain stable periodicity over macroscopic length scale even under 100% stretching. The lateral spacing in diffraction patterns shows negative correlation with the amount of stretch, which is consistent with the reciprocal relationship between the dimensions in diffraction pattern and the spacing of the corresponding grating. The longitudinal spacing in the diffraction patterns exhibits less dependency on the amount of stretch, owing to the relatively small changes in longitudinal periodicity with lateral stretch. The diffraction patterns also show significant dependence on the wavelength of the incoming laser. The polymeric stretchable tunable optic grating structures present elastic behavior with the stretch and spontaneously recovers to the relaxed (i.e., un-stretched) geometry as the stretch is removed under cyclic mechanical actuation. The diffracted beams form clear patterns that change consistently with the deformation of the polymeric stretchable tunable optic grating structures. This behavior indicates excellent capability for dynamic, wavelength-dependent beam steering.

Three-dimensional (3D) kirigami nanocomposites thus provide a new dimension to traditional reflective and refractive optics due to the out-of-plane surface features, as illustrated in FIGS. 2a-2b. For example, the reconfigurable fins and slits formed by the cuts illustrated in the nano-kirigami sheets shown in FIGS. 2a-2b allow for efficient modulation of light by reversible expansion (or strain levels) of the kirigami cut sheets. Consequently, nano-kirigami sheets such as those shown in FIGS. 2a-2b may be incorporated into one or more optic components of the M-LIDAR system described here. More specifically, these light, thin and inexpensive optical components may be used, for example, for the red and infrared portions of the light spectrum to achieve beam steering and/or polarization modulation. According to some implementations, kirigami nanocomposites of the type shown in FIGS. 2a-2b may be utilized to form the beam steer 106, s-polarization linear polarizer 114, and/or p-polarization linear polarizer 116 of the system illustrated in FIG. 1.

In certain variations, kirigami nanocomposites can form kirigami optical modules manufactured from ultrastrong layer-by-layer (LbL) assembled nanocomposites. These nanocomposite materials having high strength, for example, about 650 MPa and an elastic modulus (E) of about 350 GPa, for example, providing exceptional mechanical properties, environmental robustness, along with a wide temperature range of operations (e.g., from −40° to +40° C.), and proven scalability. High elasticity of LbL composites makes them reconfigurable and their high temperature resilience enables integration with different types of actuators and CMOS compatibility. In certain aspects, the nanocomposite material may be coated with plasmonic films such as titanium nitride, gold, and the like to enhance interaction with target wavelengths of photons, for example, 1550 nm photons where the laser source has a wavelength of 1550 nm.

In certain other variations, the kirigami nanocomposite sheets can include magnetic materials distributed therein or coated thereon. For example, a layer of nickel may be deposited on an ultra-strong composite. The layer of nickel can serve as a magnetic and reflective layer, thus providing a magentoactive kirigami element. The kirigami units thus can be directly integrated with LIDAR components and serve as beam steerers (for example, using first and second order diffraction beams) or as polarizers (for example, using the first order diffraction beams).

Figure 3A:
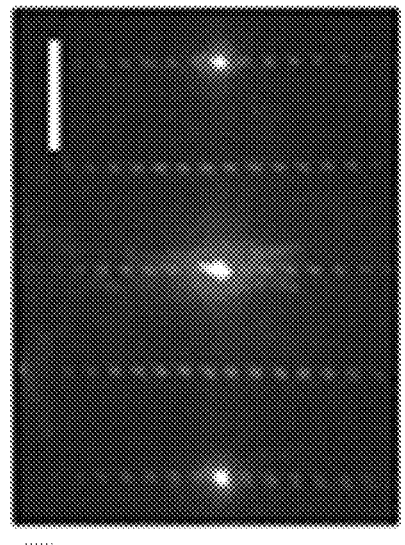
FIGS. 3a-3c are images depicting laser diffraction patters from nano-kirigami-based graphene composites for various strain levels (0% in FIG. 3a, 50% in FIG. 3b, and 100% in FIG. 3c) according to certain aspects of the present disclosure.
Figure 3B:
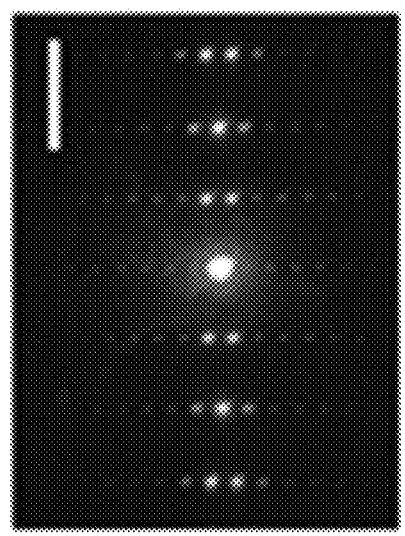
Figure 3C:
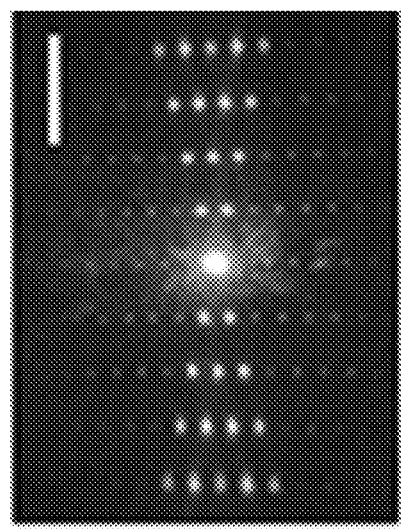

Referring now to FIGS. 3a-3c, images depicting laser diffraction patterns from nano-kirigami-based graphene composites are shown. For reference, the scale bars shown in the upper right hand corners of FIGS. 3a-3c represent 25 mm. FIG. 3a depicts the laser diffraction pattern for nano-kirigami-based graphene composites for 0% strain (relaxed state). FIG. 3b depicts the laser diffraction pattern for from nano-kirigami-based graphene composites for 50% strain. Finally, FIG. 3c depicts the laser diffraction pattern for from nano-kirigami-based graphene composites for 100% strain.

Polarization modulation of LIDAR beams and polarization analysis of returned photons will enable the acquisition of information about the object material that is currently lacking in, for example, car safety and robot vision devices. Machine Learning (ML) algorithms may be trained to recognize different materials and MST classification based on their unique polarization signatures may be achieved. The MST classification of objects by material may, among other advantages, accelerate object recognition and improve the accuracy of machine perception of surroundings.

Before turning to the specifics of FIGS. 4a-4d, it bears noting that system 100 of FIG. 1 and corresponding methods of material detection and object classification may be carried out, according to some examples of the present disclosure, utilizing non-nano-kirigami optical elements. Indeed, such non-nano-kirigami optical element-based M-LIDAR systems may be preferred for certain applications (e.g., where size and weight are not major concerns). Accordingly, implementations of the presently disclosed M-LIDAR system in which nano-kirigami optical elements are not utilized, other traditional optical components such as (i) IR polarizers; (ii) beam splitters; (iii) lenses made from CdS, ZnS, silicon; and/or (iv) similarly suitable optical elements may be equally employed without deviating from the teachings herein. However, nano-kirigami optical elements are generally favored for M-LIDAR systems that benefit from being light and small.

With that as a backdrop, FIGS. 4a-4d illustrate a step-by-step lithographic-type process for manufacturing a nano-kirigami-based optical element, such as a beam splitter or linear polarizer. According to one example, the process for manufacturing the nano-kirigami-based optical element set forth in FIGS. 4a-4d may include using a vacuum assisted filtration (VAF), whereby nanocomposite material may be deposited as a layer on a stiff (e.g., plastic) substrate suitable for lithographic patterning. As noted above, U.S. Publication No. 2016/0299270 describes methods of making such nanocomposite materials, including by vacuum assisted filtration (VAF) and layer-by-layer (LBL) deposition process techniques. Nanocomposites manufactured according to this process are known to display high toughness and strong light absorption.

FIG. 4a is a simplified illustration of the first step of the process 400 whereby a nanocomposite layer 404a is deposited on a substrate 402 via VAF, layer-by-layer deposition (LBL), or any other suitable deposition method known in the art. FIG. 4b illustrates the second step in the process 400 after the nanocomposite 404a of FIG. 4 has been patterned to produce a patterned kirigami nanocomposite 404b through select regions of the nanocomposite layer 404a, for example, via a photolithographic cutting process, atop the substrate 402. FIG. 4c illustrates the third step in the process 400 whereby the cut or patterned kirigami nanocomposite 404b is released (e.g., lifted) from the substrate 402. Finally, FIG. 4d illustrates the final step of the process 400 whereby at least a portion of the patterned kirigami nanocomposite 408 has been incorporated into a subassembly configured for, among other things, beam steering and/or modulation.

The subassembly shown in FIG. 4d includes the patterned kirigami nanocomposite portion 408, a microfabricated silicon layer 406 housing, and one or more bent beam actuators 410. Dual sided arrows 412 illustrate the potential directions of the actuator 410 motions. As discussed in additional detail below, the bent beam actuators 410 may be configured to exert reversible strain on the kirigami nanocomposite portion 408 so as to, for example, adjust the size and/or orientation of various slits and/or fins making up the pattern of the kirigami nanocomposite portion 408. Thus, the kirigami nanocomposite portion 408 may thus be reversibly stretched at strain levels ranging from 0% to 100%.

A more detailed discussion of the patterning aspect of the process 400 shown in FIGS. 4a-4d follows. The manufacturing of the kirigami transmissive optical modules may follow the step-by-step diagram shown in FIGS. 4a-4d. The modulation of LIDAR laser beams in visible and IR ranges may require feature sizes at, for example, 3 μm, created over 0.1-1 cm widths. The feasibility of such patterns has already been demonstrated. The 2D geometry of the patterns may be selected based on computer simulations of their 2D to 3D reconfiguration when stretched or strained. The 3D geometry may be modeled for optical properties, for instance, polarization modulation in the desirable wavelength range. Photolithography may be a primary patterning tool, enabled by the chemistry of VAF composites described above. The patterning protocol may be substantially similar to that currently being used for large scale microfabrication. For example, VAF composites on glass substrates may be coated by standard SU8 photoresist following photo patterning using commercial conventional mask aligner. Examples of kirigami patterns prepared are shown in FIGS. 5a-5c, discussed in greater detail below.

Kirigami optical elements may be manufactured by integrating kirigami nanocomposite sheets with commercial microelectromechanical actuators as show, for example, in FIG. 4d. The microelectromechanical systems (MEMS) kirigami units may be directly integrated with LIDAR components and serve as beam steerers (using, for example, first and second order diffraction beams) and/or polarizers (using, for example, the first order diffraction beams). Considering the nearly endless number of kirigami patterns and wide variety of 2D to 3D reconfigurations, kirigami optical elements with both beam steering and polarization capabilities, as well as other optical functions, are contemplated within the teachings herein.

With brief reference to FIGS. 5a-5c, various images of example kirigami optical elements are shown. For example, FIG. 5a is an image of a kirigami optical element, such as the kirigami optical elements described herein, fabricated on a wafer in line with the process 400 described above with regard to FIGS. 4a-4d. FIG. 5b is a SEM image of the kirigami optical element of FIG. 5a under 0% strain. Finally, FIG. 5c is a SEM image of the kirigami optical element of FIG. 5a under 100% strain. The scale bars depicted in the upper right hand corners of FIGS. 5b-5c are 50 μm.

Photolithographic techniques can be used to manufacture kirigami transmissive or reflective optical modules/elements. By way of example, modulation of LIDAR laser beams having a wavelength of about 1550 nm may have feature sizes from greater than or equal to about 1 μm to less than or equal to about 2 μm, created over widths ranging from greater than or equal to about 0.1 cm to less than or equal to about 1 cm exemplified by the current patterns in FIGS. 5a-5c. The two dimensional (2D) geometry of the patterns can be selected based on computer simulations of their 2D to three dimensional (3D) reconfiguration when stretched. The 3D geometry can be modeled for optical properties, for instance, polarization modulation in the desirable wavelength range.

Photolithography is a primary patterning technique that can be used in combination with LbL composites to form kirigami optical elements. In one example, the patterning protocol can include providing an LbL composite on a glass substrate that is coated by a standard SU-8 photoresist following photo patterning using a commercial mask aligner (UM Lurie Nanofabrication Facility, LNF). Such a process can form kirigami elements like those shown in FIGS. 5a-5c.

Another representative simplified compact M-LIDAR system 300 for use in a vehicle, such as an autonomous vehicle, is provided in FIG. 11. To the extent that the components in the M-LIDAR system 300 are similar to those in the M-LIDAR system 100 of FIG. 1, for brevity, their function will not be repeated herein. The M-LIDAR system 300 may include a laser 310, a beam steerer 312, one or more polarizers (not shown, but similar to the first polarizer 114 and second polarizer 116 described in the context of FIG. 1), and a processor (not shown, but similar to processor 126 that shown in FIG. 1). In the M-LIDAR system 300, a pulse generator 312 is connected to laser 310 and generates a polarized or unpolarized first light pulse 314 and a polarized or unpolarized second light pulse 316. The pulse generator 312 is connected to an oscilloscope 324. The first light pulse 314 and second light pulse 316 generated by laser 310 are directed towards a beam steerer 318, which may in certain aspects, be a kirigami-based beam steerer like those discussed previously above. The beam steerer 318 is connected to and controlled by a servo-motor/Arduino 352. The servo-motor/Arduino 352 is connected to a controller 350 that may be a MATLAB' control, by way of non-limiting example. As noted previously above, the beam steerer 318 may polarize, modify, split, and/or modulate one or both of the first light pulse 314 and second light pulse 316 by way of non-limiting example, as discussed previously above. The first light pulse 314 and second light pulse 316 are then directed towards an object 340 to be detected.

The first light pulse 314 and second light pulse 316 may be diffusively reflected off the object 110. One or more pulses of light collectively form a first reflected beam 342 and a second reflected beam 344 that constitutes a reflected version of the first light pulse 314 and second light pulse 316. According to some examples, the first reflected beam 342 and the second reflected beam 344 may have a different polarization than the first light pulse 314 and second light pulse 316 (i.e., prior to reflection off of the object 340). After reflecting from the object 340, the first reflected beam 342 and second reflected beam 344 may be directed towards an off-axis parabolic reflector/mirror 330 that redirects the first reflected beam 342 and second reflected beam 344 towards a beam splitter 360.

The first reflected beam 342 is thus split and directed to both a first detector 362 and a second detector 364. The first detector 362 and the second detector 364 may be connected to the oscilloscope 324. The first detector 362 may be an s-polarization detector configured to detect an intensity of one or more reflected s-polarization light pulses forming the first reflected light beam 342. Likewise, the second detector 364 may be a p-polarization detector configured to detect an intensity of one or more reflected p-polarization light pulses forming the first reflected light beam 342. After passing through beam splitter 360, the second reflected light beam 344 is directed to both the first detector 362 and the second detector 364, where an intensity of the s-polarization light pulses and/or p-polarization light pulses can be detected from the second reflected light beam 344. The first detector 362 and the second detector 364 may be connected to a processor (not shown), which further analyzes information received therefrom as described previously above. The M-LIDAR system 300 is compact and may have dimensions of about 7 inches by 12 inches, by way of non-limiting example, making it particularly suitable to mount in a vehicle.

MST classification, as introduced above, may be realized according to examples of the present disclosure through the use of light source-based MST classification with light polarization classifiers added to point clouds. In one example, for each 3D range measurement of a point cloud, linear/circular polarization of returned photons may be acquired. In addition, local curvature and local scattering conditions may be made directly based on the polarization state of the returned photons, although the relationship between surface properties and polarization state may, in some instances, be noisy due to surface roughness.

Referring now to FIG. 6, MST polarization analysis of reflected laser light was performed using AI data processing with a neural network algorithm to produce the confusion matrix of FIG. 6. More specifically, the confusion matrix was produced based on analysis of s and p-polarized light beams (such as the s and p-polarized light beams 118, 120 shown in FIG. 1). Along the x-axis, predicted types of materials for a test object subjected to the M-LIDAR system and processing methods described herein are identified. Along the y axis, the true types of materials for the test object are identified. The accuracy of various predictions of the AI algorithm for the various material types are reflected at the intersections of the predicted material types and true material types. As shown, the materials detection functionality of the M-LIDAR system may be accomplished with a high degree of accuracy (including at or above 99% in some instances) using these polarized light beams.

Referring now to FIG. 7, a confusion matrix for the detection of simulated black ice compared to other materials is shown. Again, the materials detection functionality of the M-LIDAR system may be accomplished with a high degree of accuracy (including at 100% in some instances).

FIG. 8 illustrates one example of an M-LIDAR device 800 for use in, for example, black ice detection (e.g., when installed in a vehicle or the like). While the present example focuses on a black-ice detection application, those having ordinary skill will recognize that the device 800 is not limited to black ice detection, and may be suitably employed for a wide range of material detection and object classification applications, including on autonomous vehicles. The device 800 includes a housing 802, an emitter 804 (i.e., an emitter for emitting light pulses making up a laser light beam), a first detection 806a, and a second detector 806b. According to one example, one or more of the detectors 806a, 806b include orthogonal polarization analyzers. Furthermore, according to one example, one or more of the emitter 804, detector 806a, and/or detector 806b may be made with kirigami optical elements. Although the primary example of the device is use within an automobile, the device could also be used, for example, within an aircraft, such as a drone or the like.

Referring now to FIG. 9, a flowchart illustrating a method 900 of performing object classification using an M-LIDAR system is provided. The method 900 begins at 902 where an unpolarized light pulse is generated. At 904, the unpolarized light pulse is linearly polarized to produce a linearly polarized light pulse. The linearly polarized light pulse may be emitted towards an object and reflect back off of the object to produce a reflected linearly polarized light pulse. At 906, the reflected linearly polarized light pulse may be linearly polarized for s-polarization to produce a reflected s-polarization light pulse.

At 908, the reflected linearly polarized light pulse may be linearly polarized for p-polarization to produce a reflected p-polarization light pulse. At 910, an intensity of the reflected s-polarization light pulse may be detected. At 912, an intensity of the reflected p-polarization light pulse may be detected. At 914, at least one material of the object may be detected based on the intensity of the reflected s-polarization light pulse and the intensity of the reflected p-polarization light pulse. Finally, at 916, the object may be classified based on the detected at least one material. Following 916, the method 900 concludes.

Finally, according to some examples, kirigami patterns may be used as MST tags for the polarization-based detection of objects. Mass-produced kirigami components can also be added to paints to impart a specific polarization response in road signs, clothing, markers, vehicles, household items, or any other suitable objects.

In certain variations, LIDAR systems of the present disclosure can provide modulation of transmitted and reflected beams. Kirigami-based optical elements can be added to an emitter side of the LIDAR to serve as beam steerers, which can thus replace conventional bulky rotational or liquid crystal phase array beam steerers. Magnetic actuation modules can be integrated with a 1550 nm laser source. To reduce the bulk of the beam steerer, fiber optics can be coupled directly with the module.

In certain variations, LIDAR systems provided by the present disclosure may provide enhanced detection in precipitation and/or humid atmospheric conditions. For example, the LIDAR systems contemplated by the present disclosure may be particularly suitable for use in low visibility conditions by employing a laser with a wavelength of about 1550 nm, by way of non-limiting example, which provides enhanced detection and performance during poor weather conditions, including low visibility conditions that accompany fog, rain, and snow. Such LIDAR systems can enable long-range warnings, for example, up to 200 meters, which is especially useful for highway driving conditions. Conventional LIDARs use laser with wavelengths of about 900 nm, which is convenient for silicon-based detectors. However, these conventional laser beams experience relatively strong scattering in humid atmospheric conditions. LIDARs operating with 1550 nm can utilize high transparency of humid air, which is advantageous for all different levels of autonomy from proximity warnings to assisted driving and full autonomous ride modality. However, such LIDARs can be bulky and expensive due to high weight and cost of near-infra-red optics. In accordance with certain aspects of the present disclosure, kirigami-based optic elements can resolve this issue by taking advantage of the space-charge and subwavelength effects possible for the patterned kirigami sheets, see for example, FIGS. 2a-2b. As shown in FIGS. 3a-3b, such kirigami sheets can effectively modulate and beam steer near-infrared light lasers using the reconfigurable out-of-plane patterns of the kirigami sheets. A 1550 nm beam steering device incorporating such kirigami-based optical elements can be used as thin, light, and inexpensive solid-state LIDAR. Furthermore, the versatility of kirigami technology allows one to potentially adapt patterns for specific applications, for example, customizing the LIDAR system to specific vehicles and/or to adapt it to surfaces of different curvature of automotive parts.

In certain aspects, the present disclosure can provide LIDAR systems with relatively fast detection, by using two-stage object proposal and detection methods without sacrificing accuracy for latency. For example, improved model accuracy and generalizability for classification models can include enhancing static object classifiers by adding a material dimension to data. Objects with material fingerprints that contain plastic, wood and brick are very unlikely to move, while those with metal or fabric fingerprints are more likely be pedestrians and vehicles. Moreover, as the material dimension is more robust to scenario variations, these models generalize better to rare and complicated cases, such as construction sites and streets with complex festival decorations. Thus, material fingerprints greatly enhance model accuracy for point cloud association models with impact on tracking and autonomous vehicle maps. For example, the material dimension of the point clouds can make the detection and classification much more reliable, as pedestrians walking with bicycles can be picked up as point clouds, with metal materials on the lower side with some fabric or skin features from the pedestrian. It is then much easier for the self-driving systems to discern it from a pure pedestrian. Also, the material fingerprints of the object make it easier for the system to associate the point clouds with the correct object classification, helping to maintain the correct and consistent composite-object classification.

The present disclosure thus provides inexpensive and compact LIDAR systems with enhanced object recognition, including an ability to distinguish material types, provide earlier detection and warning systems, including an ability to identify an object within milliseconds, and high efficacy in low visibility conditions, among other benefits.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system comprising:
    a laser configured to generate a light pulse emitted towards an object;
    at least one polarizer configured to polarize reflected, scattered, or emitted light returned from the object;
    a processor configured to detect at least one material of the object based on an intensity and polarization of the polarized reflected, scattered, or emitted light from the object; and
    at least one polarization detector connected to the at least one polarizer and the processor and configured to detect the intensity of the polarized reflected, scattered, or emitted light from the object and an angle of incidence associated with the polarized reflected, scattered, or emitted light from the object.

2. The system of claim 1, further comprising a beam steerer configured to adjust a polarization of the light pulse to produce a polarization-adjusted light pulse emitted towards the object.

3. The system of claim 2, wherein the beam steerer is configured to adjust the polarization of the light pulse by changing the polarization of the light pulse.

4. The system of claim 2, wherein the polarization of the light pulse is at least one of the following types of polarization: linear polarization, circular polarization, and elliptical polarization.

5. The system of claim 1, wherein the processor is further configured to classify the object based on the detected at least one material of the object.

6. The system of claim 5, wherein the processor is configured to classify the object based on the detected at least one material of the object by applying a machine-learning algorithm.

7. The system of claim 6, wherein the machine-learning algorithm comprises an artificial neural network algorithm.

8. The system of claim 1, wherein the at least one polarizer is configured to polarize the reflected, scattered, or emitted light returned from the object by applying at least one of the following types of polarization: linear polarization, circular polarization, and elliptical polarization.

9. The system of claim 8, wherein the at least one polarizer is configured to apply linear polarization by applying at least one of s-type linear polarization and p-type linear polarization.

10. The system of claim 1, wherein the at least one polarizer comprises a plurality of polarizers.

11. The system of claim 1, wherein the at least one polarization detector comprises a plurality of polarization detectors.

12. The system of claim 1, wherein the processor is further configured to detect the at least one material of the object additionally based on the angle of incidence associated with the polarized reflected, scattered or emitted light from the object.

13. A method comprising:
    generating a light pulse emitted towards an object with a laser;
    polarizing, with at least one polarizer, reflected, scattered, or emitted light returned from the object;
    detecting, with at least one polarization detector connected to the at least one polarizer, an intensity and an angle of incidence of the polarized reflected, scattered, or emitted light from the object; and
    detecting, with a processor, at least one material of the object based on the intensity and polarization of the polarized reflected, scattered, or emitted light from the object.

14. The method of claim 13, further comprising:
    adjusting a polarization of the light pulse with a beam steerer to produce a polarization-adjusted light pulse emitted towards an object.

15. The method of claim 13, further comprising:
    classifying the object based on the detected at least one material of the object.

16. The method of claim 15, wherein classifying the object comprises classifying the object by applying a machine-learning algorithm.

17. The method of claim 16, wherein the machine-learning algorithm comprises an artificial neural network algorithm.

18. A system comprising:
    a laser configured to generate a polarized light pulse emitted towards an object;
    at least one polarizer configured to polarize reflected, scattered, or emitted light returned from the object;
    at least one polarization detector connected to the at least one polarizer and configured to detect an intensity and an angle of incidence of the polarized reflected, scattered, or emitted light from the object;
    a processor connected to the at least one polarization detector and configured to detect at least one material of the object based on the intensity and polarization of the polarized reflected, scattered or emitted light from the object.

19. The system of claim 18 wherein the at least one polarizer is configured to polarize the reflected, scattered, or emitted light returned from the object by applying at least one of the following types of polarization: linear polarization, circular polarization, and elliptical polarization.

20. The system of claim 19, wherein the at least one polarizer is configured to apply linear polarization by applying at least one of s-type linear polarization and p-type linear polarization.

21. The method of claim 13, wherein the detecting, with the processor, the at least one material of the object is additionally based on the angle of incidence of the polarized, reflected, scattered, or emitted light from the object.

22. The system of claim 18, wherein the processor is further configured to detect the at least one material of the object additionally based on the angle of incidence of the polarized reflected, scattered, or emitted light from the object.

\* \* \* \* \*